US012764161B2

(12) United States Patent
Desanti et al.

(10) Patent No.: US 12,764,161 B2
(45) Date of Patent: Oct. 13, 2026

(54) SYSTEMS AND METHODS FOR TRANSPORT LAYER SECURITY (TLS) CONCATENATION

(71) Applicant: Dell Products, L.P., Round Rock, TX (US)

(72) Inventors: Claudio Desanti, Santa Cruz, CA (US); David L. Black, Acton, MA (US)

(73) Assignee: Dell Products L.P., Round Rock, TX (US)

( * ) Notice: Subject to any disclaimer, the term of this patent is extended or adjusted under 35 U.S.C. 154(b) by 387 days.

(21) Appl. No.: 18/357,109

(22) Filed: Jul. 22, 2023

(65) Prior Publication Data

US 2025/0030736 A1 Jan. 23, 2025

(51) Int. Cl.

*H04L 9/40* (2022.01)
*H04L 9/08* (2006.01)
*H04L 9/32* (2006.01)

(52) U.S. Cl.

CPC ............ *H04L 63/166* (2013.01); *H04L 9/085* (2013.01); *H04L 9/3242* (2013.01)

(58) Field of Classification Search

CPC ...... H04L 63/166; H04L 9/085; H04L 9/3242
See application file for complete search history.

(56) References Cited

U.S. PATENT DOCUMENTS

2005/0108571 A1* 5/2005 Lu ........................ H04L 63/0853 726/4
2006/0041938 A1* 2/2006 Ali .................. G06Q 20/40975 726/14
2021/0111996 A1* 4/2021 Pismenny ........... H04L 63/0485
2021/0365388 A1* 11/2021 Jo ............................ H04L 9/06
2021/0367942 A1* 11/2021 Cheng ................... H04W 12/06
2022/0078165 A1* 3/2022 Ludin ................. H04L 63/0853
2022/0210220 A1* 6/2022 Shivanna ............ H04L 67/1008
2022/0231995 A1* 7/2022 Ostrikov ............. G06F 13/4269
2022/0417004 A1* 12/2022 Sapuntzakis .......... H04L 9/0822
2023/0034545 A1* 2/2023 Pismenny ............. H04L 45/566
2023/0137082 A1* 5/2023 Escott ................. H04W 56/001 713/171
2023/0141761 A1* 5/2023 Gerlitz ................ H04L 67/1044 709/224

* cited by examiner

*Primary Examiner* — Techane Gergiso
(74) *Attorney, Agent, or Firm* — Fogarty LLP

(57) ABSTRACT

Systems and methods for Transport Layer Security (TLS) concatenation are described. In an illustrative, non-limiting embodiment, an Information Handling System (IHS) may include: a processor; and a memory coupled to the processor, wherein the memory comprises program instructions store thereon that, upon execution by the processor, cause the IHS to: derive a shared session key during a first Transmission Control Protocol (TCP) connection with a second IHS; and after disconnection of the first TCP connection, perform a Transport Layer Security (TLS) negotiation with the second IHS via a second TCP connection using the shared session key.

16 Claims, 20 Drawing Sheets

1900

| VALUE (1910) | DESCRIPTION (1920) | TRANSPORT APPLICABILITY (1930) |
|---|---|---|
| 1940 00H | NOSC: NO SECURE CHANNEL CONCATENATION | N/A |
| 1950 01H | OBSOLETE | |
| 1960 02H | NEWTLSPSK: USED ON AN ADMIN QUEUE OVER A TCP CHANNEL WITHOUT TLS TO GENERATE A PSK AND ASSOCIATED PSK IDENTITY. THIS {PSK, PSK IDENTITY} PAIR MAY BE USED TO SET UP TLS SECURE CHANNEL FOR SUBSEQUENT ADMIN AND I/O QUEUES. | TCP |
| 1970 03H | REPLACETLSPSK: USED ON AN ADMIN QUEUE OVER A TLS SECURE CHANNEL TO GENERATE A PSK AND ASSOCIATED PSK IDENTITY. THIS {PSK, PSK IDENTITY} PAIR REPLACES THE {PSK IDENTITY} PAIR THAT WAS USED TO SET UP THE TLS SECURE CHANNEL OVER WHICH THE AUTHENTICATION TRANSACTION IS PERFORMED. | TCP WITH TLS |
| 1980 ALL OTHER VALUES | RESERVED | |

FIG. 19

SYSTEMS AND METHODS FOR TRANSPORT LAYER SECURITY (TLS) CONCATENATION

FIELD

This disclosure relates generally to Information Handling Systems (IHSs), and more specifically, to systems and methods for determining a pre-shared key (PSK) identity for Transport Layer Security (TLS), and for TLS concatenation.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Transport Layer Security (TLS) is a cryptographic protocol designed to provide communications security over a computer network. The protocol is widely used in applications such as email, and instant messaging, but its use in securing HTTPS remains the most publicly visible. The TLS protocol aims primarily to provide security, including confidentiality, integrity, and authenticity through the use of cryptography, such as the use of certificates, between two or more communicating computer applications. It runs in the presentation layer and is itself composed of two layers: the TLS record and the TLS handshake protocols.

TLS is a proposed Internet Engineering Task Force (IETF) standard, first defined in 1999, and the current version is TLS 1.3, defined in August 2018. TLS builds on the now-deprecated Secure Sockets Layer ("SSL") specifications (1994, 1995, 1996) developed by Netscape Communications for adding the HTTPS protocol to their Navigator web browser. TLS 1.2 is strongly discouraged in favor of the modernized, more secure TLS 1.3. Older versions of TLS (e.g., 1.0, 1.1, etc.) and all versions of SSL are insecure, and hence prohibited in IETF standards.

SUMMARY

Systems, methods, and service frameworks for determining a pre-shared key (PSK) identity for Transport Layer Security (TLS), and for TLS concatenation, are described. In an illustrative, non-limiting embodiment, an Information Handling System (IHS) may include: a processor; and a memory coupled to the processor, where the memory includes program instructions store thereon that, upon execution by the processor, cause the IHS to: establish a Transmission Control Protocol (TCP) connection with a another IHS; generate a Transport Layer Security (TLS) pre-shared key (PSK); derive based, at least in part, on the TLS PSK, a unique PSK identity associated with the TLS PSK; and perform a TLS negotiation with the other IHS using the TLS PSK and the unique PSK identity.

In some embodiments, the program instructions, upon execution by the processor, further cause the IHS to: determine a PSK digest based, at least in part, on a shared session key, information regarding an identity of the IHS, and information regarding an identity of the other IHS. In some embodiments, in order to determine the PSK identity that is unique for the TLS PSK, the program instructions, upon execution by the processor, further cause the IHS to: derive the unique PSK identity based, at least in part, on the PSK digest. In some embodiments, in order to generate the TLS PSK, the program instructions, upon execution by the processor, further cause the IHS to: calculate the TLS PSK associated with the unique PSK identity based, at least in part, on the shared session key, and the PSK digest.

In some embodiments, the program instructions, upon execution by the processor, further cause the IHS to: establish a secure channel with the other IHS based, at least in part, on the TLS negotiation.

In some embodiments, the program instructions, upon execution by the processor, further cause the IHS to: perform a Non-Volatile Memory Express over Fabrics (NVMe-oF) authentication exchange with the other IHS; and derive a shared session key for the TCP connection with the other IHS. In some embodiments, the TLS PSK and the unique PSK identity are determined based, at least in part, on the shared session key. In some embodiments, the shared session key includes a generated PSK. In some embodiments, the shared session key includes a retained PSK derived from a configured PSK configured by a user or administrator. In some embodiments, the IHS is a host, and the other IHS is a controller.

In some embodiments, the TCP connection includes a Non-Volatile Memory Express (NVMe)/TCP connection, where to establish the NVMe/TCP connection with the other IHS, the program instructions, upon execution by the processor, further cause the IHS to: perform a connect exchange with the other IHS; establish one or more NVMe queues; and associate the IHS as a host, and the other IHS as a controller. In some embodiments, the program instructions, upon execution by the processor, further cause the IHS to: use the TLS PSK and the unique PSK identity to set up other administration and I/O queues for the TCP connection. In some embodiments, the program instructions, upon execution by the processor, further cause the IHS to: use the TLS PSK and the unique PSK identity to only set up queues belonging to a single association.

In another illustrative, non-limiting embodiment, a method includes: establishing, by a first Information Handling System (IHS), a Transmission Control Protocol (TCP) connection with a second IHS; calculating a Transport Layer Security (TLS) pre-shared key (PSK); deriving based, at least in part, on the TLS PSK, a unique PSK identity for the TLS PSK; and performing a TLS negotiation with the second IHS using the TLS PSK and the unique PSK identity.

In some embodiments, the method further includes: computing a PSK digest based, at least in part, on a shared session key, information regarding an identity of the first IHS, and information regarding an identity of the second IHS; where deriving the unique PSK identity further includes: deriving the unique PSK identity based, at least in part, on part, on the PSK digest; and where calculating the TLS PSK further includes: calculating the TLS PSK associated with the unique PSK identity based, at least in part, on the shared session key, and the PSK digest.

In some embodiments, the method further includes: establishing a secure channel with the second IHS based, at least in part, on the TLS negotiation. In some embodiments, the method further includes: performing a Non-Volatile Memory Express over Fabrics (NVMe-oF) authentication exchange with the second IHS; and deriving a shared session key for the TCP connection with the second IHS, where the TLS PSK and the unique PSK identity are determined based, at least in part, on the shared session key. In some embodiments, the shared session key includes either a generated PSK or a retained PSK derived from a configured PSK configured by a user or administrator.

In another illustrative, non-limiting embodiment, one or more non-transitory computer-readable storage media store program instructions that when executed on or across one or more processors, cause the one or more processors to: establish a Transmission Control Protocol (TCP) connection with a remote Information Handling System (IHS); determine a Transport Layer Security (TLS) pre-shared key (PSK); determine based, at least in part, on the TLS PSK, a PSK identity that is unique for the TLS PSK; and perform a TLS negotiation with the remote IHS using the TLS PSK and the associated unique PSK identity.

In some embodiments, the program instructions further cause the one or more processors to: determine a PSK digest based, at least in part, on a shared session key, information regarding an identity of the one or more processors, and information regarding an identity of the remote IHS; where to determine the PSK identity that is unique for the TLS PSK, the program instructions further cause the one or more processors to: derive the unique PSK identity based, at least in part, on the PSK digest; and where to determine the TLS PSK, the program instructions further cause the one or more processors to: determine the TLS PSK associated with the unique PSK identity based, at least in part, on the shared session key, and the PSK digest.

In another illustrative, non-limiting embodiment, an IHS may include: a processor; and a memory coupled to the processor, where the memory includes program instructions store thereon that, upon execution by the processor, cause the IHS to: derive a shared session key during a first Transmission Control Protocol (TCP) connection with a second IHS; and after disconnection of the first TCP connection, perform a Transport Layer Security (TLS) negotiation with the second IHS via a second TCP connection using the shared session key.

In some embodiments, the TLS negotiation for the second TCP connection is performed to establish an administration queue. In some embodiments, the program instructions, upon execution by the processor, further cause the IHS to: perform a second TLS negotiation with the second IHS via a third TCP connection using the shared session key; and establish a first I/O queue based, at least in part, on the second TLS negotiation. In some embodiments, the program instructions, upon execution by the processor, further cause the IHS to: perform a third TLS negotiation with the second IHS via a fourth TCP connection using the shared session key; and establish a second I/O queue based, at least in part, on the third TLS negotiation.

In some embodiments, the first TCP connection is a Non-Volatile Memory Express (NVMe) TCP connection, and where the second TCP connection is an NVMe TCP connection using TLS. In some embodiments, the shared session key with the second IHS is derived by a first authentication transaction, where the first authentication transaction uses a Diffie-Hellman (DH) hash-based message authentication code (HMAC) Challenge-Handshake Authentication Protocol (CHAP). In some embodiments, the second TCP connection uses a different TCP source port than the first TCP connection, and where unexpected non-TLS traffic of the first TCP connection is stranded by the disconnect of the first TCP connection. In some embodiments, the shared session key with the second IHS is derived by a first authentication transaction, and where the first authentication transaction includes a secure channel concatenation value usable on an administration queue over a TCP channel without TLS to generate a new shared session key.

In some embodiments, the TLS negotiation for the second TCP connection is performed to establish an administration queue, and where the program instructions, upon execution by the processor, further cause the IHS to: perform an authentication transaction on the administration queue including a secure channel concatenation value usable on an administration queue over a TLS secure channel to generate a second shared session key, where the second shared session key replaces the shared session key for future TLS negotiations.

In some embodiments, the TLS negotiation for the second TCP connection is performed by a second authentication transaction including a secure channel concatenation value that indicates no secure channel concatenation. In some embodiments, the program instructions, upon execution by the processor, further cause the IHS to: attempt to perform a second TLS negotiation with the second IHS for a third TCP connection using the shared session key; determine that the shared session key is not available on the second IHS; perform an authentication transaction via the second TCP connection including a secure channel concatenation value usable on an administration queue over a TLS secure channel to generate a second shared session key, where the second shared session key replaces the shared session key for subsequent TLS negotiations; and perform the second TLS negotiation with the second IHS for the third TCP connection using the second shared session key.

In some embodiments, the program instructions, upon execution by the processor, further cause the IHS to: determine that the shared session key is not available on the second IHS; close the TLS negotiation with the second IHS; perform an authentication transaction via the second TCP connection, where the second TCP connection is unsecured, including a secure channel concatenation value usable on an administration queue over a TCP channel without TLS to generate a second shared session key; disconnect the second TCP connection; establish a third TCP connection with the second IHS; and perform a second TLS negotiation with the second IHS via the third TCP connection using the second shared session key derived during the second TCP connection.

In some embodiments, the program instructions, upon execution by the processor, further cause the IHS to: establish a secure channel with the second IHS based, at least in part, on the TLS negotiation. In some embodiments, to derive the shared session key with the second IHS, the program instructions, upon execution by the processor, further cause the IHS to: perform a Non-Volatile Memory Express over Fabrics (NVMe-oF) authentication exchange with the second IHS.

In another illustrative, non-limiting embodiment, a method includes: establishing, by a first Information Handling System (IHS) a first Transmission Control Protocol (TCP) connection with a second IHS; deriving a shared session key with the second IHS; disconnecting the first TCP connection; establishing a second TCP connection with the second IHS; performing a Transport Layer Security (TLS) negotiation with the second IHS via the second TCP connection using the shared session key derived during the first TCP connection; and establishing an administration queue based, at least in part, on the TLS negotiation.

In some embodiments, the method further includes: establishing a third TCP connection with the second IHS; performing a second TLS negotiation with the second IHS via the third TCP connection using the shared session key derived during the first TCP connection; and establishing a first I/O queue based, at least in part, on the second TLS negotiation. In some embodiments, the first TCP connection is a Non-Volatile Memory Express (NVMe) TCP connection, the second TCP connection is an NVMe TCP connection using TLS.

In another illustrative, non-limiting embodiment, one or more non-transitory computer-readable storage media store program instructions that when executed on or across one or more processors, cause the one or more processors to: establish a first Transmission Control Protocol (TCP) connection with a remote Information Handling System (IHS); derive a shared session key with the remote IHS; disconnect the first TCP connection; establish a second TCP connection with the remote IHS; perform a Transport Layer Security (TLS) negotiation with the remote IHS via the second TCP connection using the shared session key derived during the first TCP connection; and establish an administration queue based, at least in part, on the TLS negotiation.

In some embodiments, the program instructions further cause the one or more processors to: establish a third TCP connection with the remote IHS; perform a second TLS negotiation with the remote IHS via the third TCP connection using the shared session key derived during the first TCP connection; and establish a first I/O queue based, at least in part, on the second TLS negotiation. In some embodiments, the first TCP connection is a Non-Volatile Memory Express (NVMe) TCP connection, and the second TCP connection is an NVMe TCP connection using TLS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 19 provides a chart listing updated AUTH_Negotiate SC_C Values, their description, and their transport applicability, to define the new TLS concatenation behavior.

DETAILED DESCRIPTION

Figure 1:
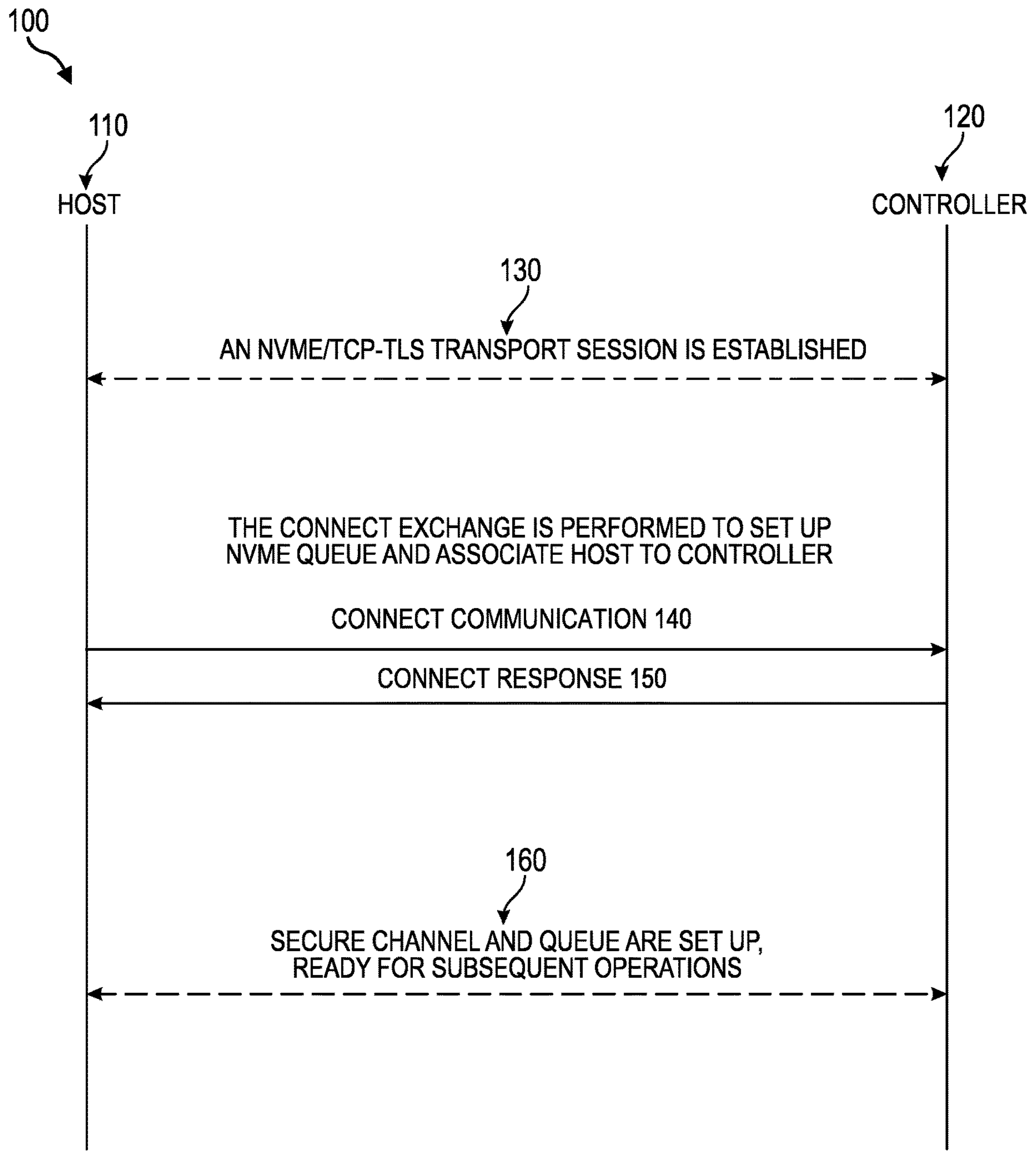
FIG. 1 (PRIOR ART)
FIG. 1 (Prior Art) is a flow diagram illustrating a process of setting up a secure channel and NVMe queue between a host and a controller using an NVMe/TCP transport session that incorporates TLS.

Systems and methods for determining a pre-shared key (PSK) identity for Transport Layer Security (TLS) are described herein. In addition, systems and methods for providing a new TLS concatenation on the Admin Queue using explicit disconnect, such that all I/O queues start directly in TLS, and TLS concatenation only applies to the Admin Queue, are also described herein. In addition, systems and methods for using new values (e.g., AUTH_Negotiate secure channel concatenation ("SC_C") values) to define the new TLS concatenation behavior, are also described herein.

Client-server applications can use the TLS protocol to communicate across a network in a way designed to prevent eavesdropping and tampering. TLS is widely used as a Transmission Control Protocol (TCP) secure channel protocol. A secure channel, in some embodiments, provides authentication, confidentiality, and cryptographic integrity. For a typical (e.g., web) usage, a server can use a certificate with TLS, and a client can authenticate after the TLS setup (e.g., TLS-protected HTTP).

Since applications can communicate either with or without TLS (or SSL), therefore to communicate with TLS, the client can request that the server set up a TLS connection. One of the main ways of achieving this is to use a different port number for TLS connections. Port 80 can typically be used for unencrypted HTTP traffic while port 443 can be a port used for encrypted HTTPS traffic. Another mechanism is to make a protocol-specific request to the server to switch the connection to TLS—for example, when using mail and news protocols.

Once a client and server have agreed to use TLS, they can negotiate a stateful connection by using a handshaking procedure. The protocols can use a handshake secured by asymmetric cryptography to establish not only TLS protocol settings but also a session-specific shared key, with which further communication is encrypted using a symmetric cipher. During this handshake, the client and server can agree on various parameters used to establish the connection's security:

The handshake can begin when a client connects to a TLS-enabled server requesting a secure connection, and the client presents a list of supported cipher suites (ciphers and hash functions). From this list, the server can pick a cipher and hash function that it also supports and notify the client of the decision. The server can then sometimes provide identification in the form of a digital certificate, although when using PSKs, digital certificates are not used. The certificate can contain a server name, a trusted certificate authority ("CA") that vouches for the authenticity of the certificate, and the server's public encryption key. The client confirms the validity of the certificate before proceeding.

To generate the session keys used for the secure connection, the client can either: (a) encrypt a random number (PreMasterSecret) with the server's public key and send the result to the server (which only the server should be able to decrypt with its private key); both parties can then use this random number to generate a unique session key for subsequent encryption and decryption of data during the session; or (b) use Diffie-Hellman key exchange (or its variant elliptic-curve DH) to securely generate a random and unique session key for encryption and decryption that has the additional property of forward secrecy. For example, if the server's private key is disclosed in future, it cannot be used to decrypt the current session, even if the session is monitored and recorded by a third party.

This can then conclude the handshake and begin a secured connection, which is encrypted and decrypted with the session key until the connection closes. If any one of the above steps fails, then the TLS handshake fails, and the connection is not created. Applications generally use TLS as if it were a transport layer, even though applications using TLS must actively control initiating TLS handshakes and handling of exchanged authentication certificates.

When secured by TLS, connections between a client (e.g., a web browser) and a server (e.g., website) will have one or more of the following properties. First, the connection can be confidential because a symmetric-key algorithm is used to encrypt the data transmitted. The keys for this symmetric encryption are generated uniquely for each connection and are based on a shared secret that was negotiated at the start of the session. The server and client can negotiate the details of which encryption algorithm and cryptographic keys to use before the first byte of data is transmitted (see below). The negotiation of the shared secret can be both secure (the negotiated secret is unavailable to eavesdroppers and cannot be obtained, even by an attacker who places themself in the middle of the connection) and reliable (no attacker can modify the communications during the negotiation without being detected).

Second, the identity of the communicating parties can be authenticated using public-key cryptography. This authentication can be required for the server and optional for the client. Third, the connection can be reliable (or has integrity) because each message transmitted includes a message integrity check using a cryptographic message authentication code to prevent undetected alteration of the data during transmission.

TLS supports many different security mechanisms for exchanging keys, encrypting data, and authenticating message integrity. As a result, secure configuration of TLS involves many configurable parameters, and not all choices provide all of the confidentiality-related properties described in the list above. Attempts have been made to subvert aspects of the communications security that TLS seeks to provide, and the protocol has been revised several times to address these security threats. Developers of web browsers have repeatedly revised their products to defend against potential security weaknesses after these were discovered.

The TLS protocol can exchange records, which encapsulate the data to be exchanged in a specific format. Each record can be compressed, padded, appended with a message authentication code (MAC), and/or encrypted, all depending on the configuration of the connection. A record can have a content type field that designates the type of data encapsulated, a length field and a TLS version field. The data encapsulated may be control or procedural messages of the TLS itself, or simply the application data needed to be transferred by TLS. The specifications (cipher suite, keys etc.) required to exchange application data by TLS, are agreed upon in the "TLS handshake" between the client requesting the data and the server responding to requests.

The protocol therefore defines both the structure of payloads transferred in TLS and the procedure to establish and monitor the transfer.

When the connection starts, the record can encapsulate a "control" protocol—the handshake messaging protocol. This protocol can be used to exchange all the information required by both sides for the exchange of the actual application data by TLS. The protocol defines the format of messages and the order of their exchange. These may vary according to the requirements of the client and server—i.e., there are several possible procedures to set up the connection. This initial exchange can result in a successful TLS connection (where both parties are ready to transfer application data with TLS) or an alert message.

A typical connection example follows, illustrating a handshake for TLS 1.3. A client sends a ClientHello message specifying the highest TLS protocol version it supports, a list of supported ciphers in order of the client's preference and makes a guess on what key algorithm will be used so that it can send a secret key to share if needed. If the client is attempting to perform a resumed handshake, it may send a session ID. By making a guess at what key algorithm will be used, the server eliminates a round trip.

After receiving the ClientHello, the server sends a ServerHello message, containing the chosen protocol version, its key, a certificate, the chosen cipher suite, and the Finished message. To confirm or allow resumed handshakes the server may send a session ID. After the client receives the server's Finished message, it now is coordinated with the server on which cipher suite to use.

In cryptography, a pre-shared key (PSK) can be a shared secret which was previously shared between the two parties using some secure mechanism before it needs to be used. To build a key from shared secret, a key derivation function is typically used. Such systems almost always use symmetric key cryptographic algorithms. The characteristics of this secret or key are determined by the system which uses it; some system designs require that such keys be in a particular format. It can be a password, a passphrase, or a hexadecimal string. The secret is used by all systems involved in the cryptographic processes used to secure the traffic between the systems.

In some embodiments, TLS can use PSKs in its cryptographic protocols to provide secure communication based on the PSKs. These pre-shared keys can be symmetric keys shared in advance among the communicating parties. Some protocols use a Diffie-Hellman key exchange authenticated with a pre-shared key.

Usually, TLS uses public key certificates or Kerberos for authentication. However, when using PSKs, TLS can instead use symmetric keys, shared in advance among the communicating parties, to establish a TLS connection. There are several reasons to use PSKs. First, using pre-shared keys can, depending on the cipher suite, avoid the need for asymmetric cryptographic operations. This is useful if TLS is used in performance-constrained environments with limited CPU power. In addition, pre-shared keys may be more convenient from a key management point of view. For instance, in closed environments where the connections are mostly configured manually in advance, it may be easier to configure PSKs than to use certificates. Another case is when the parties already have a mechanism for setting up a shared secret key, and that mechanism could be used to "bootstrap" a key for authenticating a TLS connection.

NVM Express (NVMe) is an open, logical-device interface specification for accessing a computer's non-volatile storage media, which can be attached via the PCI Express bus in the usual case, or over other interconnects when using NVM Express over Fabrics (NVMe-oF). The acronym "NVM" stands for non-volatile memory, which is often NAND flash memory that can be packaged in several physical form factors, including, for example, solid-state drives (SSDs), PCIe add-in cards, and M.2 cards. NVM Express, as a logical-device interface, can capitalize on the low latency and internal parallelism of solid-state storage devices.

Architecturally, the logic for NVMe can be physically stored within and executed by the NVMe controller chip that is physically co-located with the storage media (for example, an SSD). NVMe is largely independent of PCIe, even though SSDs use NVMe over PCIe. By its design, NVM Express can allow host hardware and software to exploit the levels of parallelism possible in modern SSDs. As a result, NVM Express can reduce I/O overhead and bring various performance improvements relative to previous logical-device interfaces, including multiple long command queues, and reduced latency. Some previous interface protocols like Advanced Host Controller Interface (AHCI) were developed for use with far slower hard disk drives (HDDs) where a very lengthy delay (relative to CPU operations) exists between a request and data transfer, where data speeds are much slower than RAM speeds, and where disk rotation and seek time give rise to further optimization requirements.

NVM Express over Fabrics (NVMe-oF) is the concept of using a transport protocol over a network to connect remote NVMe devices, in contrast to NVMe over PCIe (NVMe/PCIe) where physical NVMe devices are connected to a PCIe bus either directly or over one or more PCIe switches to a PCIe bus. One of the supported NVMe transport protocols is TCP, designated as NVMe/TCP. With NVMe-oF, a user can write to and read from a remote NVMe block device, exported via an NVMe over Fabrics network using TCP, using the same NVMe commands and data structures as any other locally attached high-performance block device. With NVMe-oF, a user can map the block device over TCP with minimal additional overhead.

TLS 1.3 is part of the NVMe/TCP transport specification. TLS is not specified for other NVMe-OF IP-based protocols (e.g., RDMA-based RoCEv2).

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The embodiments of the present disclosure will be described in more detail below with reference to the accompanying drawings. Although the accompanying drawings show some embodiments of the present disclosure, it should be understood that the present disclosure can be implemented in various forms and should not be explained as being limited to the embodiments stated herein. Rather, these embodiments are provided for understanding the present disclosure more thoroughly and completely. It should be understood that the accompanying drawings and embodiments of the present disclosure are for illustrative purposes only and are not intended to limit the protection scope of the present disclosure.

FIG. 1 (Prior Art) is a flow diagram 100 illustrating a process of setting up a secure channel and NVMe queue between a host 110 and a controller 120 using an NVMe/TCP transport session that incorporates TLS. First, an NVMe/TCP-TLS transport session is established (130). Then a Connect command and response is performed to set up NVMe Queue and associate host to controller. First, the host 110 sends the controller 120 a Connect command 140. Then the controller sends the host a Connect response 150. Finally, at 160, a secure channel and queue are set up, ready for subsequent operations.

TLS secure channel for NVMe/TCP is a security network protocol based on pre-shared keys (PSKs). In order to set up the TLS channels, the two parties need to know a secret (i.e., a PSK) that is previously shared. If both parties know the PSK, then they are able to set up the TLS channel. Therefore, in order to communicate over TLS, two NVMe entities need to be configured with the same PSK. The way in which the two parties authenticate each other is by knowledge of the PSK. A first party determines that a second party knows the PSK, and the fact that the second party knows the PSK is what is telling the first party that the second party is who they say they are, therefore the second party is authenticated by the first party. This is the way that TLS has been defined for NVMe/TCP, using PSKs.

However, when PSKs are provisioned, in order to set up the configuration securely and correctly, one PSK is needed for each pair of entities. Each pair of entities requires its own PSK (limiting a "blast radius" of a potential PSK compromise). However, there is an O ($n^2$) problem with this configuration: a fabric with N hosts and M subsystems requires N×M PSKs. Lots of PSKs need to be managed with this type of configuration.

TLS concatenation addresses the problem of managing O($n^2$) PSKs. TLS concatenation can mean, for example, that the TLS channel being set up is concatenated to a previous authentication transaction, where that previous authentication transaction uses another authentication protocol. Using TLS concatenation, upon successful completion of an authentication transaction, the two involved NVMe entities generate an ephemeral shared session key, from which a 'PSK' can be derived on the fly to set up a secure channel.

In some embodiments, this ephemeral shared session key can by computed by a Diffie-Hellman (DH) hash-based message authentication code (HMAC) Challenge-Handshake Authentication Protocol (CHAP), or DH-HMAC-CHAP for short. This DH-HMAC-CHAP can be the other authentication protocol that generates the ephemeral shared session key. The TLS negotiation can then be performed using a PSK derived from that ephemeral shared session key. This reduces TLS PSK provisioning to a per-entity DH-HMAC-CHAP secret provisioning. This reduces the problem scope to an O(n) problem. A fabric with N hosts and M subsystem requires N+M secrets. TLS concatenation can be used by the NVMe-oF authentication protocol. Technical proposal (TP) 8006 and TP 8011 defined TLS concatenation as a way to deploy secure channels with TLS for NVMe/TCP.

Figure 2:
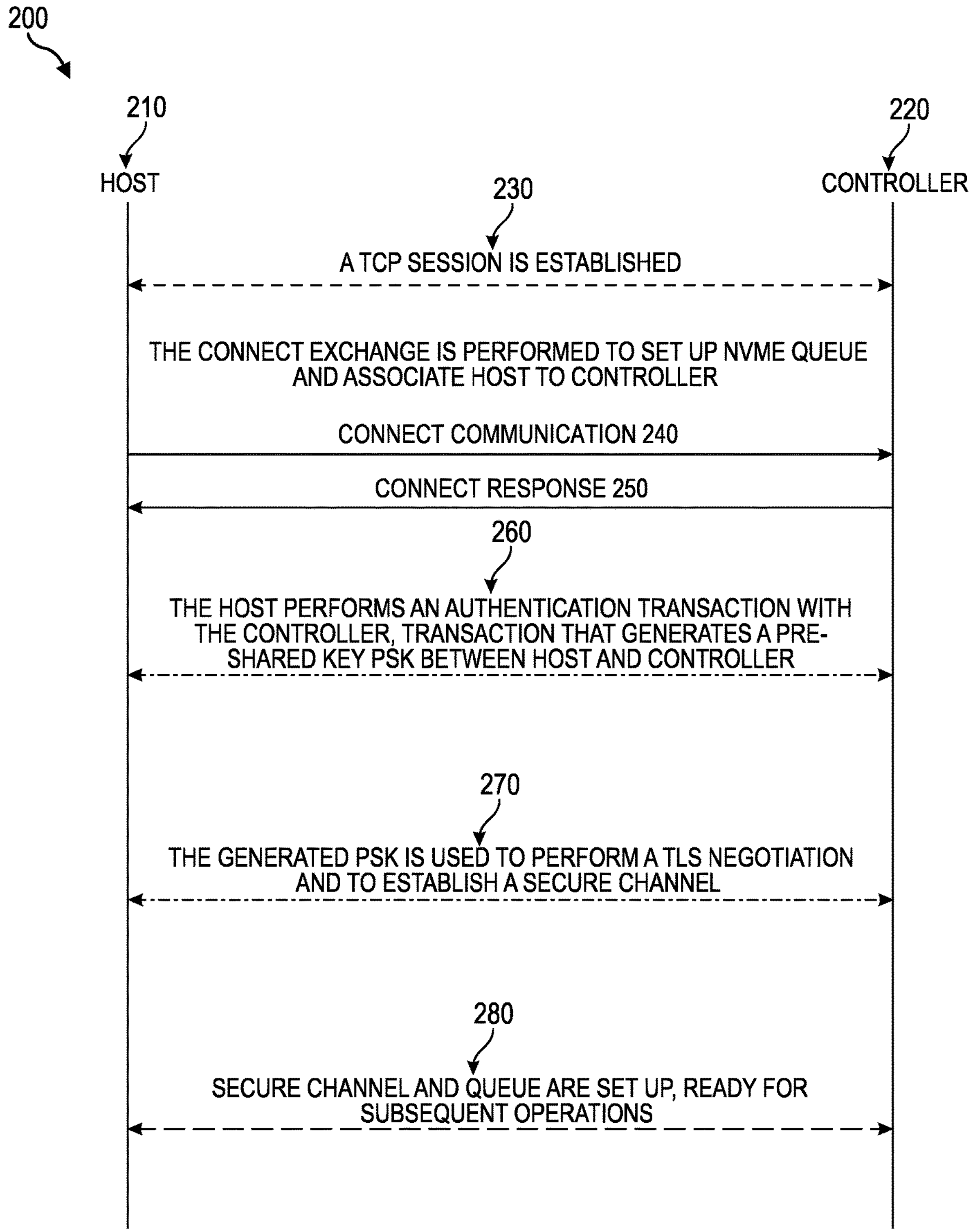
FIG. 2 (PRIOR ART)
FIG. 2 (Prior Art) is a flow diagram illustrating a process of setting up a secure channel and NVMe queue between a host and a controller using an NVMe/TCP transport session that incorporates TLS concatenation.

FIG. 2 (Prior Art) is a flow diagram 200 illustrating a process of setting up a secure channel and NVMe queue between a host 210 and a controller 220 using an NVMe/TCP transport session that incorporates TLS concatenation. First, a TCP transport session is established (230). Then a Connect command and response is performed to set up NVMe Queue and associate a host to a controller. First, the host 210 sends the controller 220 a Connect command 240. Then the controller 220 sends the host 210 a Connect response 250. Then, at 260, the host performs an authentication transaction with the controller, an authentication transaction that generates a pre-shared key (i.e., the ephemeral shared session key) between the host 210 and the controller 220. This authentication transaction can be a DH-HMAC-CHAP authentication transaction, in some embodiments. Next, at 270, the generated PSK (i.e., the generated ephemeral shared session key) is used to perform a TLS handshake and to establish a secure channel. Finally, at 280, a secure channel and queue are set up, ready for subsequent operations. With a secure channel for example, other entities cannot see or change what is happening on the secure channel.

Figure 3:
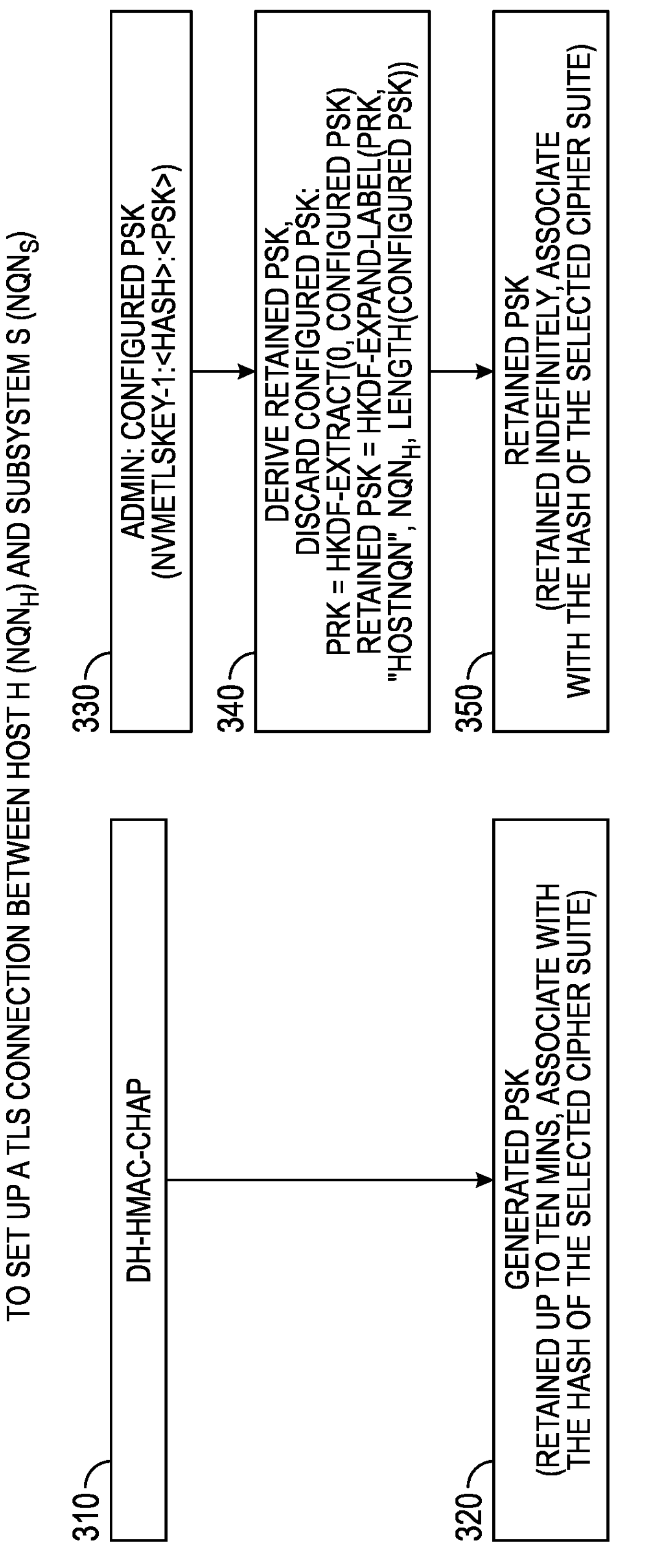
FIG. 3 (PRIOR ART)
FIG. 3 (Prior Art) is a first flow diagram detailing procedures for the derivation of PSKs and PSK Identities, in order to set up a TLS connection between host $H(NQN_h)$ and subsystem $S(NQN_s)$.

FIG. 3 (Prior Art) is a first flow diagram detailing procedures for the derivation of PSKs and PSK Identities, in order to set up a TLS connection between host H($NQN_h$) and subsystem S($NQN_s$). FIG. 3 provides two different methods for the derivation of the ephemeral shared session key using TLS concatenation, upon successful completion of an authentication exchange, by the two involved NVMe entities. The first method is that a DH-HMAC-CHAP authentication transaction (310) produces a generated PSK 320 (i.e., a generated ephemeral shared session key). In some embodiments, this generated PSK can be retained up to ten minutes and associated with the hash of the selected cipher suite.

The second method is that an administrator or user manually configures a PSK (330). The manually configured PSK is then transformed into a retained PSK by step 340. This is done for robustness against configured PSK reuse. If, for example, an administrator or user is lazy and configures the same PSK everywhere, then the retained PSK is at least derived (from the configured PSK) with unique parameters from each entity, so that the retained PSK becomes unique. The retained PSK is derived by first performing an HKDF-Extract function (explained below) on the configured PSK to generate a Pseudo-Random Key (PRK). Then the retained PSK is generated using an HKDF-Expand-Label function, with the PRK, the string "HostNQN", the host identity $NQN_h$, and the length of the configured PSK as inputs. The configured PSK is then discarded. The result is a retained PSK 350. In some embodiments, the retained PSK can be retained indefinitely, and associated with the hash function component of the selected cipher suite.

HKDF is a simple key derivation function ("KDF") based on the HMAC message authentication code. The main approach HKDF follows is the "extract-then-expand" paradigm, where the KDF logically consists of two modules: the first stage takes the input keying material and "extracts" from it a fixed-length pseudorandom key, and then the second stage "expands" this key into several additional pseudorandom keys (the output of the KDF). HKDF-Extract takes "input key material" (IKM), such as a shared secret generated using Diffie-Hellman, and an optional salt (random data that is used as an additional input to a one-way function that hashes data), and generates a cryptographic key called the PRK. This acts as a "randomness extractor", taking a potentially non-uniform value of high min-entropy and generating a value indistinguishable from a uniform random value. HKDF-Expand, on the other hand, takes the PRK, some "information", and a length, and generates output of the desired length. HKDF-Expand acts as a pseudorandom function keyed on PRK. This means that multiple outputs can be generated from a single IKM value by using different values for the "information" field. HKDF-Expand works by repeatedly calling HMAC using the PRK as the key and the "information" field as the message. The HMAC inputs are chained by prepending the previous hash block to the "information" field and appending with an incrementing 8-bit counter.

Figure 4:
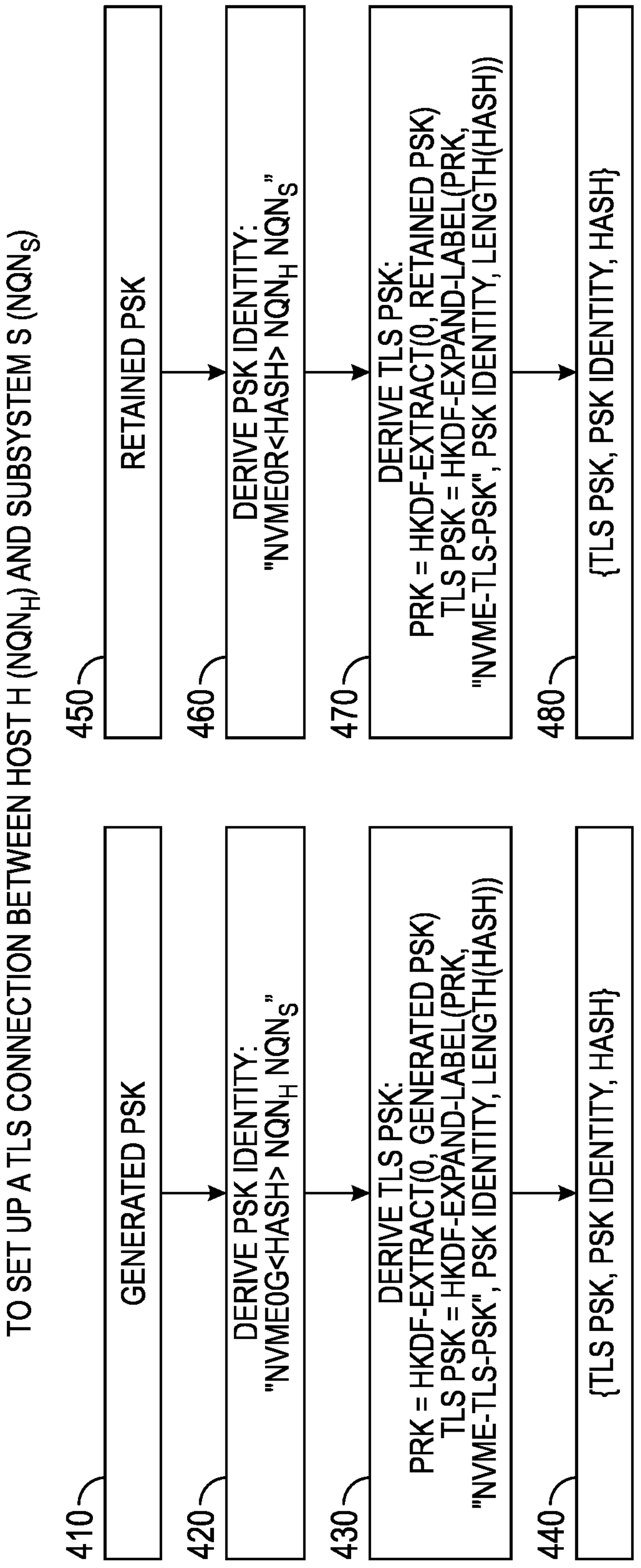
FIG. 4 (PRIOR ART)
FIG. 4 (Prior Art) is a second flow diagram detailing procedures for the derivation of PSKs and PSK Identities, in order to set up a TLS connection between host $H(NQN_h)$ and subsystem $S(NQN_s)$.

FIG. 4 (Prior Art) is a second flow diagram detailing procedures for the derivation of PSKs and PSK Identities, in order to set up a TLS connection between host H($NQN_h$) and subsystem S($NQN_s$). TLS 1.3 has a requirement that each PSK has to be associated with a specific PSK identity, and there has to be a unique relationship, meaning there has to be one identity per each PSK. This is important because the handshake that sets up the TLS channel begins with a "ClientHello" message in which the client specifies that it wants to use a specific PSK, and then provides the PSK identity to the server. The server looks to see if it has a PSK with that PSK identity, and then starts to use it. Given that the client also has the same PSK, that is the way in which the TLS channel can be set up.

The first method, on the lefthand side, starts with a generated PSK (410) which is the generated PSK (320) from FIG. 3. The second method, on the righthand side, starts with a retained PSK (450), which is the retained PSK (350) from FIG. 3. Both methods first derive a PSK identity (420, 460). The PSK identity can be a string comprising "NVMe0G<hash>$NQN_h$ $NQN_s$" for the generated PSK, or "NVMe0R<hash>$NQN_h$ $NQN_s$" for the retained PSK. The "NVMe" part of the string identifies the identity as related to NVMe. The "0" part of the string identifies version 0. The "G" or "R" part of the string identifies whether the input was a generated or retained PSK. The "<hash>" part of the string identifies the hash function to be used. TLS 1.3 specifies the use of at least two fundamental hash functions, such as SHA-256 and SHA-384. The "NQNn $NQN_s$" part of the string is the identity of the host and the identity of the subsystem, respectively. This is needed to ensure that there is one identity for each PSK.

Both methods then derive a TLS PSK (430, 470). The TLS PSK is derived by first performing an HKDF-Extract function (explained above) on either the generated PSK (430) or the retained PSK (470), in order to generate a Pseudo-Random Key (PRK). Then the TLS PSK is generated using an HKDF-Expand-Label function, with the PRK, the string "NVME-TLS-PSK", the PSK identity, and the length of the TLS PSK that is desired to be output. Finally, the data that the protocol needs is obtained (440, 480). The data can include the PSK that will be used by the protocol, its associated identity, and the hash function that will be used this TLS connection.

In a ClientHello message, as an example, a client can specify two hashes with two different PSK identities, and the server can pick one of them. Or, as another example, a client can specify one hash with one PSK identity. The server may decide to either accept or reject that one hash and PSK identity, for example. When the two parties agree on a hash function and a PSK identity, then the protocol can continue.

However, these procedures for the derivation of PSKs and PSK Identities, in order to set up a TLS connection between host H($NQN_h$) and subsystem S($NQN_s$), created problems. TP 8011 defined two methods for obtaining a PSK detailed in FIGS. 3 and 4 above. First, a retained PSK is from an administratively provisioned configured PSK. Second, a generated PSK is from a DH-HMAC-CHAP authentication transaction. TP 8011 also defined two associated PSK identities, because TLS 1.3 requires each PSK to be associated with one and only one PSK Identity. These two associated PSK identities are defined by the strings: "NVMe0R<hash><$NQN_h$><$NQN_s$>" and "NVMe0G<hash><$NQN_h$><$NQN_s$>".

The scope of a retained PSK is defined per entity pair. All TLS sessions between a host and an NVM subsystem use the (single) retained PSK. The scope of a generated PSK, however, is not well defined. TP 8011 stated "It is possible to leverage an authentication transaction to generate shared key material to use as pre-shared key (PSK) to establish a secure channel (e.g., with IPsec or TLS). In this case, the PSK generated to set up a secure channel on the Admin Queue may be reused to set up additional secure channels on the I/O queues." Therefore, it is unclear if the scope of the generated PSK is per Admin Queue or I/O Queue, or per NVMe/TCP controller, or per entity pair. This caused confusion, as is detailed in FIGS. 5, 6, and 7 below.

Figure 5:
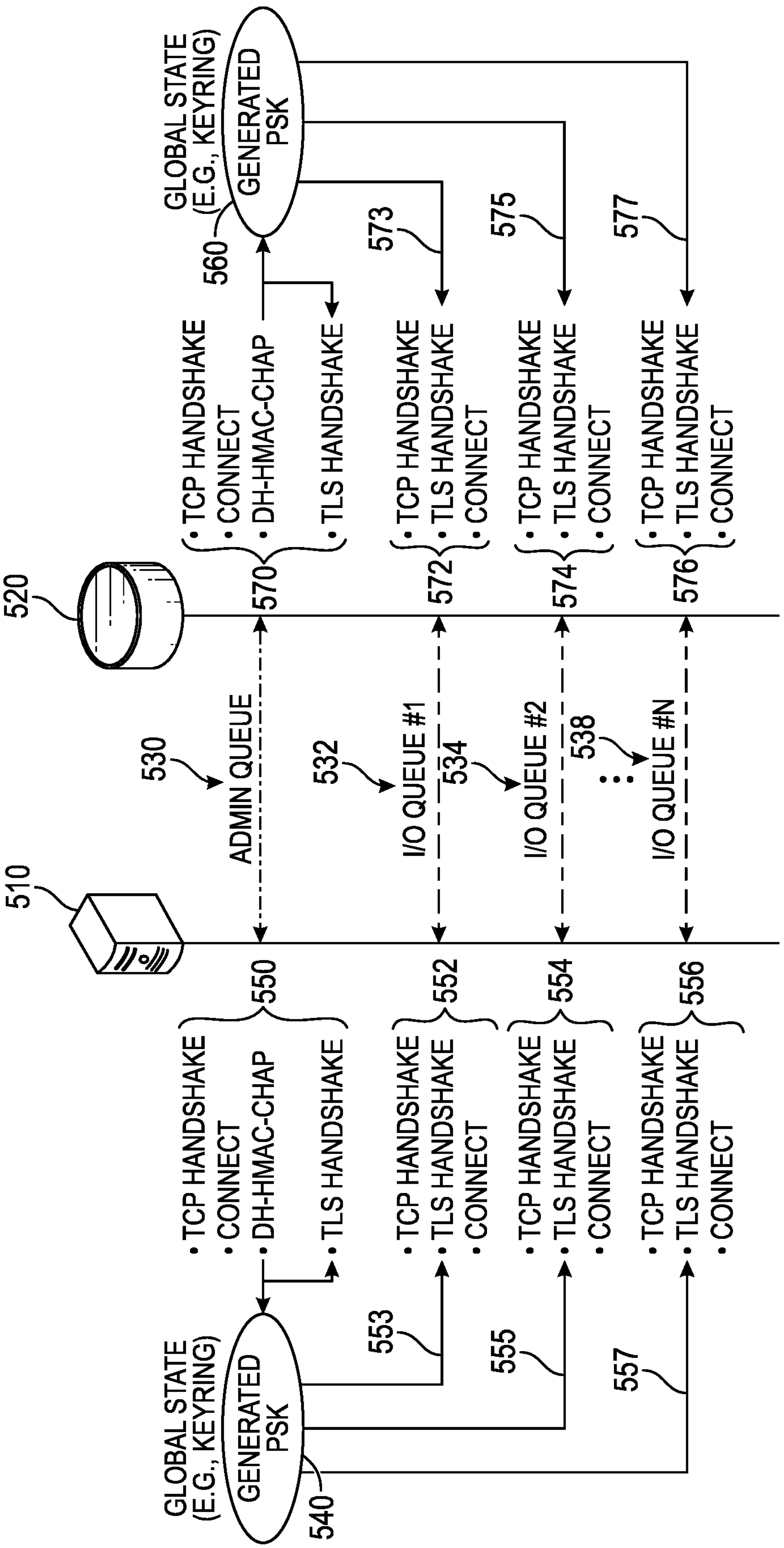
FIG. 5 (PRIOR ART)
FIG. 5 (Prior Art) is a flow diagram detailing an example intended first use case of a generated PSK, where the generated PSK has a per-controller scope, or a per-association scope.

FIG. 5 (Prior Art) is a flow diagram detailing an example intended first use case of a generated PSK, where the generated PSK has a per-controller scope, or a per-association scope. However, because of problems detailed in FIG. 8, this intended first use case cannot be actualized with the present protocol. Between a host 510 and a controller 520, NVMe/TCP establishes an admin queue 530, where all the administration commands are sent, and one or more I/O queues (532, 534, 538) where data input and output occurs.

One way to set up the administration queue (530) and the one or more I/O queues is detailed in FIG. 5. At steps 550 and 570 the host and the controller, respectively, each perform a TCP handshake, a Connect command and response to setup up the NVMe queue and associate the host to the controller, a DH-HMAC-CHAP authentication transaction to generate a PSK (540, 560), and then the generated PSK (540, 560) is used to perform a TLS handshake, which secures the administration queue (530). The generated PSK (540, 560) is then used directly for all of the I/O queues (532, 534, 538). To set up I/O queue #1 (532) the host performs steps 552 while the controller performs steps 572. A TCP handshake is performed. Then a TLS handshake is performed using (553, 573) the generated PSK (540, 560). Then a Connect command and response occurs to set up the NVMe queue and associate the host to the controller. To set up I/O queue #2 (534) the host performs steps 554 while the controller performs steps 574. A TCP handshake is performed. Then a TLS handshake is performed using (555, 575) the generated PSK (540, 560). Then a Connect command and response occurs to set up the NVMe queue and associate the host to the controller. To set up I/O queue #N (538) the host performs steps 556 while the controller performs steps 576. A TCP handshake is performed. Then a TLS handshake is performed using (557, 577) the generated PSK (540, 560). Then a Connect command and response occurs to set up the NVMe queue and associate the host to the controller.

Figure 6:
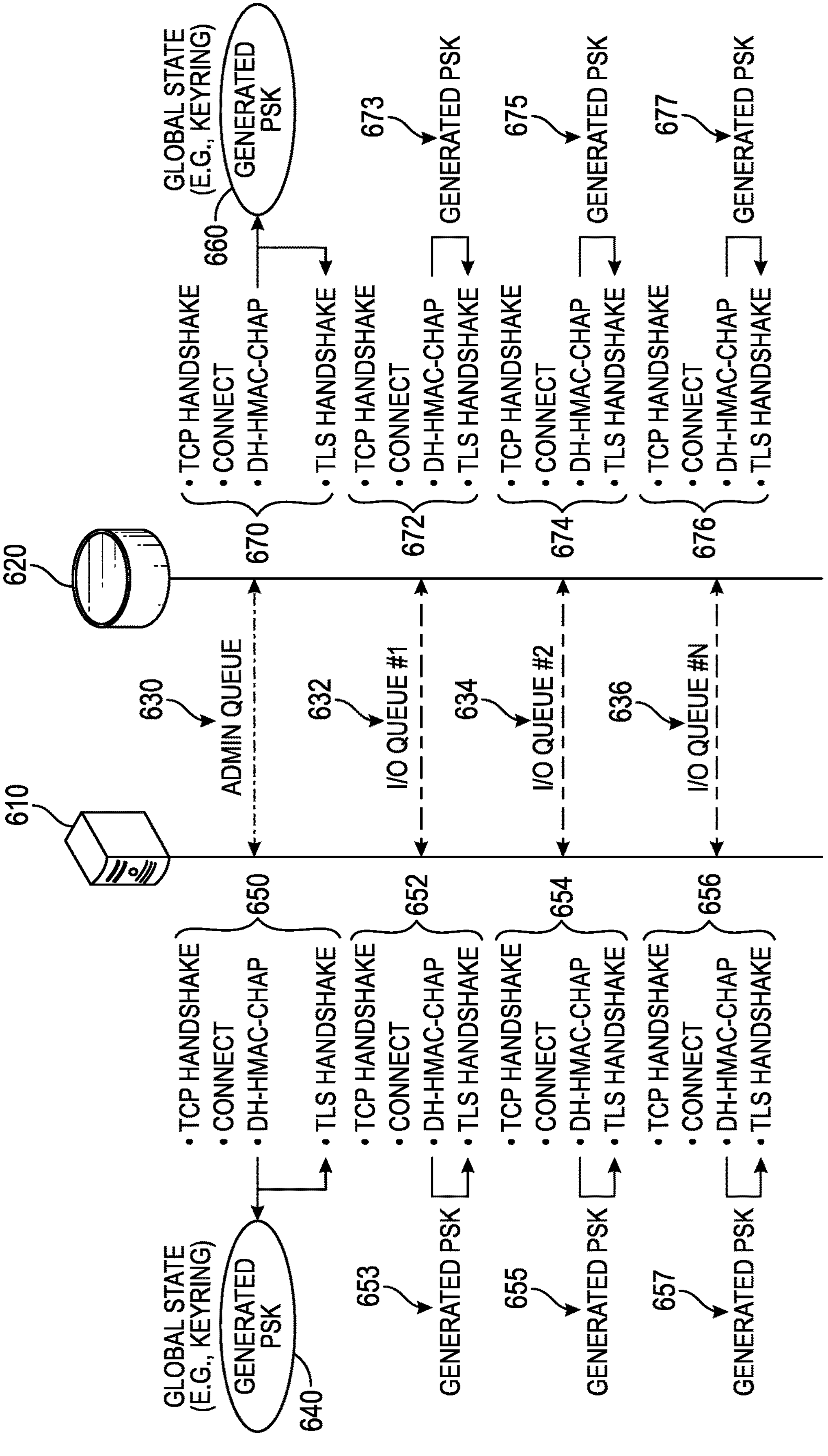
FIG. 6 (PRIOR ART)
FIG. 6 (Prior Art) is a flow diagram detailing an example intended second use case of a generated PSK, where the generated PSK has a per-queue scope that is local to each TCP connection.

FIG. 6 (Prior Art) is a flow diagram detailing an example intended second use case of a generated PSK, where the generated PSK has a per-queue scope that is local to each TCP connection. However, because of problems detailed in FIG. 8, this intended second use case cannot be actualized with the present protocol. Between a host 610 and a controller 620, NVMe/TCP establishes an admin queue 630, where all the administration commands are sent, and one or more I/O queues (632, 634, 638) where data input and output occurs.

A second way to set up the administration queue (630) and the one or more I/O queues is detailed in FIG. 6. At steps 550 and 570 the host and the controller, respectively, each perform a TCP handshake, a Connect command and response to setup up the NVMe queue and associate the host to the controller, a DH-HMAC-CHAP authentication transaction to generate a PSK (640, 660), and then the generated PSK (640, 660) is used to perform a TLS handshake, which secures the administration queue (630). Then, for each I/O queue (632, 634, 638) exactly the same process occurs. To set up I/O queue #1 (632) the host performs steps 652 while the controller performs steps 672. First, a TCP handshake is performed. Then a Connect command and response occurs to set up the NVMe queue and associate the host to the controller. Then a DH-HMAC-CHAP authentication transaction to generate a PSK (653, 673). Then a TLS handshake is performed using the generated PSK (653, 673). To set up I/O queue #2 (634) the host performs steps 654 while the controller performs steps 674. First, a TCP handshake is performed. Then a Connect command and response occurs to set up the NVMe queue and associate the host to the controller. Then a DH-HMAC-CHAP authentication transaction to generate a PSK (655, 675). Then a TLS handshake is performed using the generated PSK (655, 675). To set up I/O queue #N (636) the host performs steps 656 while the controller performs steps 676. First, a TCP handshake is performed. Then a Connect command and response occurs to set up the NVMe queue and associate the host to the controller. Then a DH-HMAC-CHAP authentication transaction to generate a PSK (657, 677). Then a TLS handshake is performed using the generated PSK (657, 677).

Figure 7:
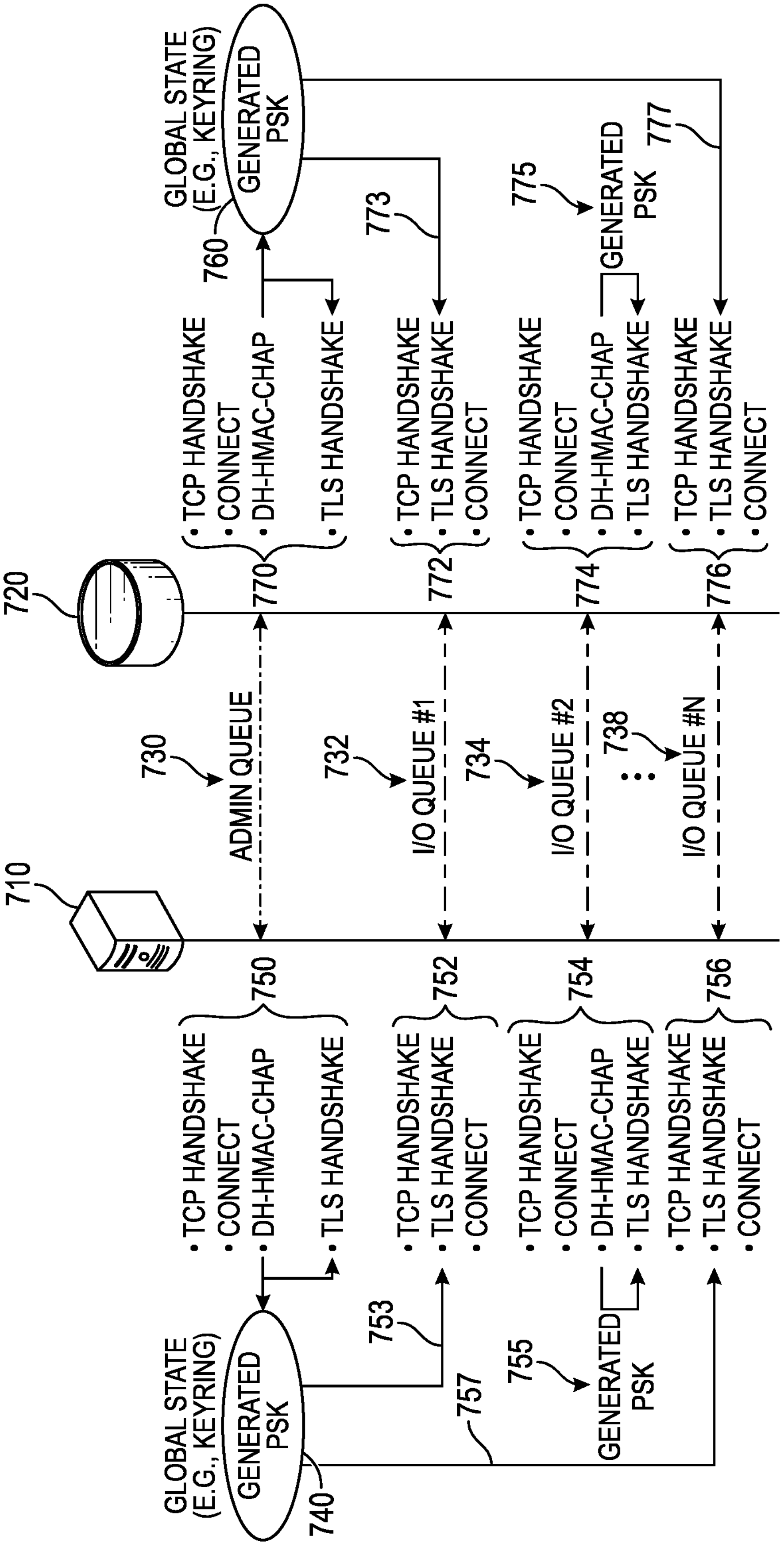
FIG. 7 (PRIOR ART)
FIG. 7 (Prior Art) is a flow diagram detailing an example intended third use case of a generated PSK, where the generated PSK has mixed scope, with some PSKs having a per-controller or per-association scope, and other PSKs having a per-queue scope that is local to each TCP connection.

FIG. 7 (Prior Art) is a flow diagram detailing an example intended third use case of a generated PSK, where the generated PSK has mixed scope, with some PSKs having a per-controller or per-association scope, and other PSKs having a per-queue scope that is local to each TCP connection. However, because of problems detailed in FIG. 8, this intended third use case cannot be actualized with the present protocol. Between a host 710 and a controller 720, NVMe/TCP establishes an admin queue 730, where all the administration commands are sent, and one or more I/O queues (732, 734, 738) where data input and output occurs.

A third way to set up the administration queue (730) and the one or more I/O queues is detailed in FIG. 7. At steps 750 and 770 the host and the controller, respectively, each perform a TCP handshake, a Connect command and response to setup up the NVMe queue and associate the host to the controller, a DH-HMAC-CHAP authentication transaction to generate a PSK (740, 760), and then the generated PSK (740, 760) is used to perform a TLS handshake, which secures the administration queue (730). The generated PSK (740, 760) is then used directly for I/O queues #1 and #N (732, 738). For I/O queue #2 (734) the same process as the administration queue occurs. To set up I/O queue #1 (732) the host performs steps 752 while the controller performs steps 772. A TCP handshake is performed. Then a TLS handshake is performed using (753, 773) the generated PSK (740, 760). Then a Connect command and response occurs to set up the NVMe queue and associate the host to the controller. To set up I/O queue #2 (734) the host performs steps 754 while the controller performs steps 774. First, a TCP handshake is performed. Then a Connect command and response occurs to set up the NVMe queue and associate the host to the controller. Then a DH-HMAC-CHAP authentication transaction to generate a PSK (755, 775). Then a TLS handshake is performed using the generated PSK (755, 775). To set up I/O queue #N (738) the host performs steps 756 while the controller performs steps 776. A TCP handshake is performed. Then a TLS handshake is performed using (757, 777) the generated PSK (740, 760). Then a Connect command and response occurs to set up the NVMe queue and associate the host to the controller.

Figure 8:
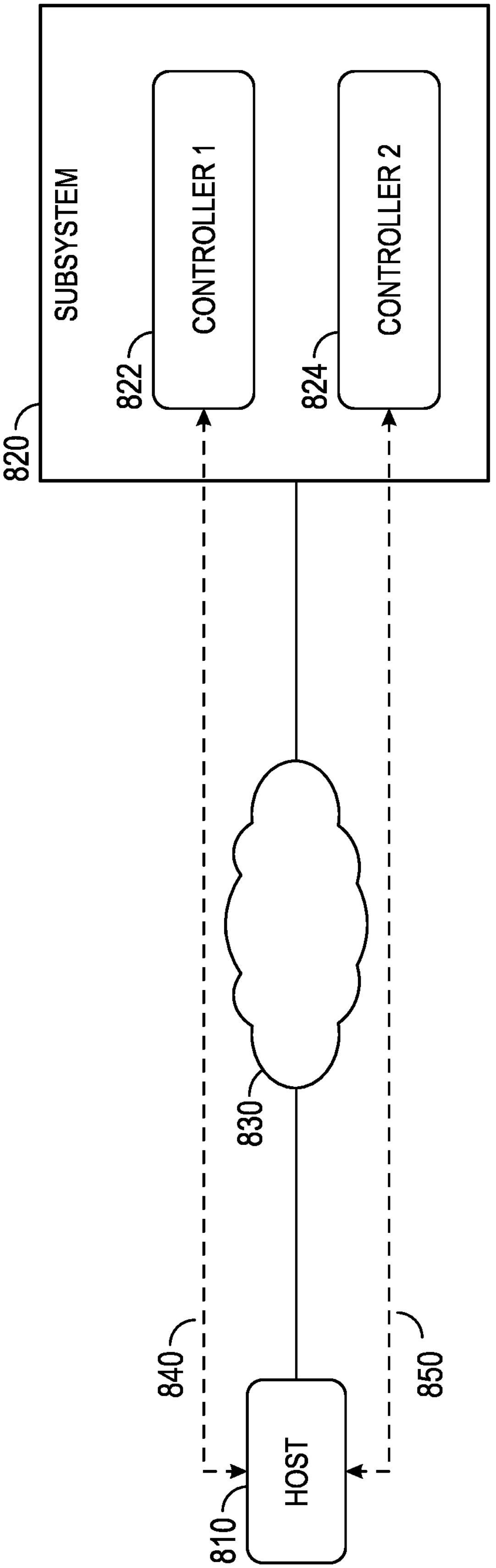
FIG. 8 (PRIOR ART)
FIG. 8 (Prior Art) is a structural diagram depicting communication between a host 810 and two controllers (822, 824) of a same subsystem (820), detailing the problems of the prior art.

FIG. 8 (Prior Art) is a structural diagram depicting communication between a host 810 and two controllers (822, 824) of a same subsystem (820), detailing the problems of the prior art. As depicted in FIG. 8, communication occurs from the host 810 to the subsystem 820 through network 830. Through this network 830, the host 810 has established different TCP connections with the different controllers (822, 824) of the subsystem 820. TCP connection 840 is established between the host 810 and controller 822. TCP connection 850 is established between the host 810 and controller 824.

However, because the way the PSK Identity is derived (see 420 of FIG. 4) using a string comprising "NVMeOG<hash>NQNn $NQN_s$" for the generated PSK, different controllers (822, 824) of the same subsystem (820) will have the same PSK identity for their different connections. This is because the string "NVMeOG<hash>NQNn NONs" will be the same across all controllers, and all queues, of a same subsystem. The different controllers, and the different queues will have the same PSK identity, which means that they cannot have different PSKs. Therefore, there is no way to distinguish between any different PSKs of the controllers and/or queues. If the use cases of FIGS. 5-8 are attempted, then the host and controller will, in all likelihood, be using different PSKs for the same PSK identity, resulting in constant TLS handshake failure between the host and the controller. Even if one tried to use the data <Host IP>: <Subsystem IP>: <Subsystem TCP Port> to restrict scope, this does not work at the controller level. Consider a host 810 connecting to two controllers (822, 824) on a subsystem 820. The data <Host IP>: <Subsystem IP>: <Subsystem TCP Port> is the same for the two associations, meaning that the PSK identity is the same, while the PSK itself is different.

In addition, different queues between the same host and controller will also have the same PSK identity for the different TCP connections corresponding to the different administration or I/O queues. These queues and/or controllers will have the same PSK identity, even though, if using different generated PSKs is attempted, they would have different TLS PSKs (where the TLS PSK is derived at 430 of FIG. 4). Therefore, there will not be a 1-to-1 unique relationship between the PSK and the PSK-identity. For each of the scenarios in FIGS. 5-8 each different generated PSK will have the same PSK identity, but a different TLS PSK. Therefore, the scopes depicted in FIGS. 5-7 cannot be used, in practice, with generated PSKs, even though users should be able to use those scopes, as was the original design intent. Therefore, in practice, the scope of the generated PSK ends up being the same as the scope of the retained PSK. The scope of both the generated and retained PSK has to be per entity pair, even though by definition the scope of the generated PSK could be different. However, because of the ambiguity in defining the PSK identity for a generated PSK, in practice, the scope of the generated PSK has to be per entity pair. Therefore, in practice, all TLS sessions between a host and an NVM subsystem must use the (single) generated PSK. This is a problem.

For example, referring back to FIG. 5, FIG. 5 details an example intended first use case of a generated PSK, where the generated PSK has a per-controller scope, or a per-association scope. In FIG. 5, a generated PSK is reused across all connections or queues (530, 532, 534, 538) between the host 510 and the same controller 520. Therefore, the generated PSK cannot be managed as ephemeral-only because it reused. In addition, the host cannot disambiguate associations to different controllers, because those different controllers will also have the same PSK identity. All controllers of the same subsystem will have to share the same PSK. The PSK will have to have a scope that is greater than just one controller or just one association. In addition, referring to FIG. 6, the PSK will have to have a scope that is greater than just one administration queue or just one I/O queue (where FIG. 6 depicts an intended, but unrealizable, per-queue scope for the generated PSK).

Figure 9:
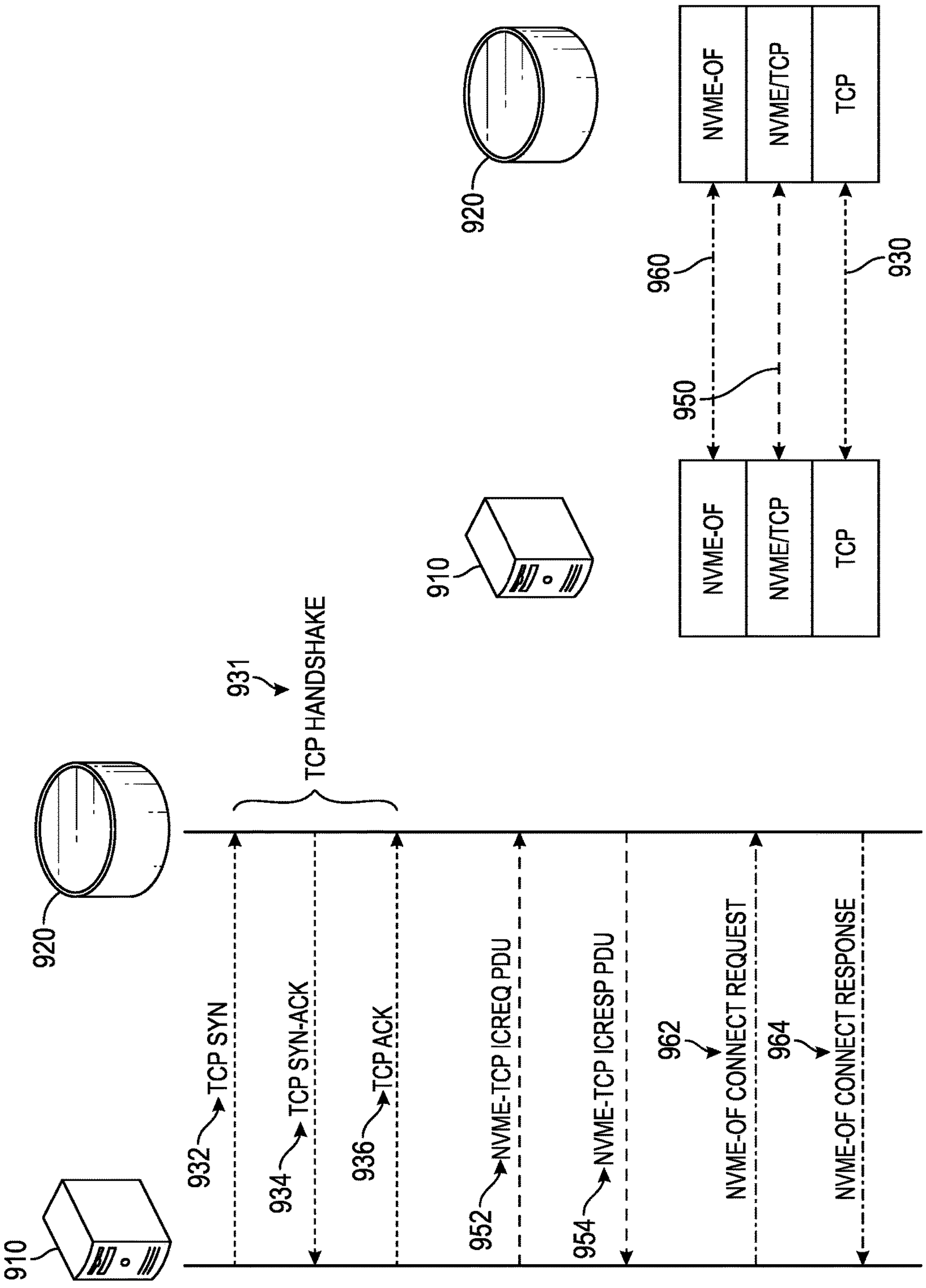
FIG. 9 (PRIOR ART)
FIG. 9 (Prior Art) is a first flow diagram detailing procedures for setting up a secure channel and NVMe queue between a host 910 and a controller 920 using an NVMe/TCP transport session that incorporates TLS concatenation.
Figure 10:
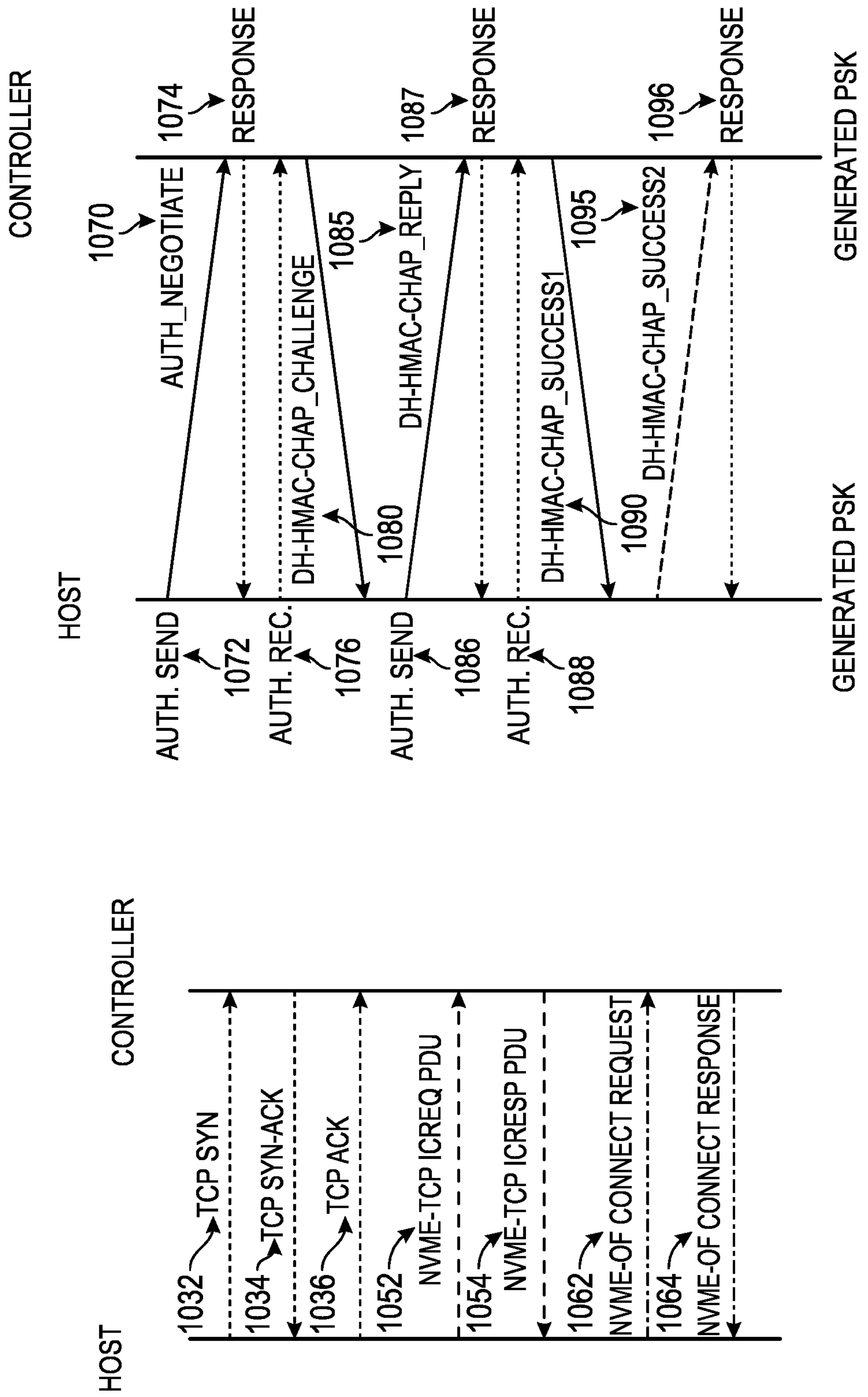
FIG. 10 (PRIOR ART)
FIG. 10 (Prior Art) is a second flow diagram detailing procedures for setting up a secure channel and NVMe queue between a host and a controller using an NVMe/TCP transport session that incorporates TLS concatenation.
Figure 11:
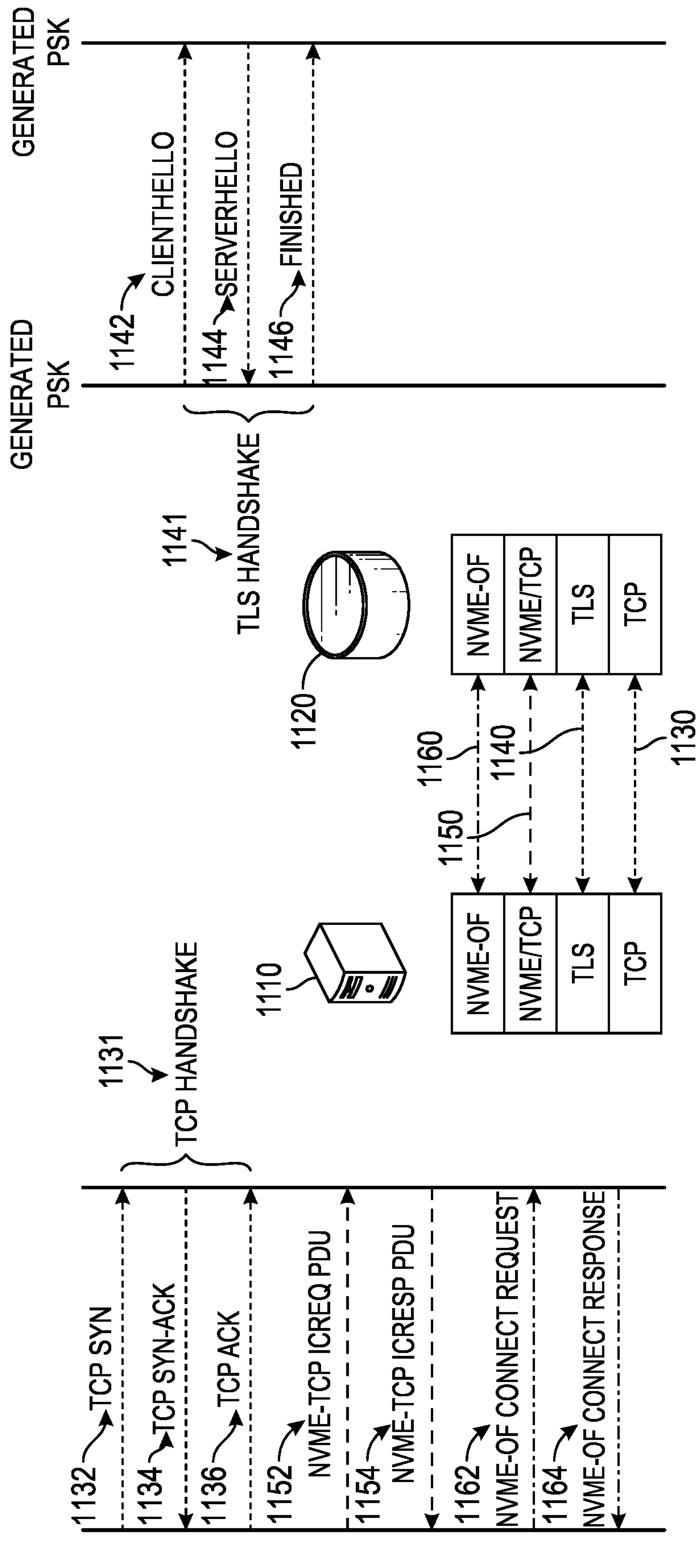
FIG. 11 (PRIOR ART)
FIG. 11 (Prior Art) is a third flow diagram detailing procedures for setting up a secure channel and NVMe queue between a host and a controller using an NVMe/TCP transport session that incorporates TLS concatenation.

Another problem with the current protocol is that, when performing TLS concatenation using an NVMe/TCP transport session that incorporates TLS, the Connect command is unprotected. This makes meddler-in-the-middle attacks available to nefarious actors. FIGS. 9, 10, and 11 (Prior Art) detail previous procedures for TLS concatenation that leaves the transport session unsecure for a period of time, allowing for meddler-in-the-middle attacks, for example. More specifically, FIG. 9 (Prior Art) is a first flow diagram detailing procedures for setting up a secure channel and NVMe queue between a host 910 and a controller 920 using an NVMe/TCP transport session that incorporates TLS concatenation.

In FIG. 9, the first layer between the host 910 and the controller 920 is the TCP transport layer 930. To establish the TCP transport layer, a TCP handshake 931 takes place. TCP uses a three-way handshake to establish a reliable connection. The connection is full duplex, and both sides synchronize (SYN) and acknowledge (ACK) each other. The exchange is performed in three steps-TCP-SYN (932), TCP-SYN-ACK (934), and TCP-ACK (936)—as shown in FIG. 9. TCP-SYN (932) is used to initiate and establish a connection. It also helps you to synchronize sequence numbers between devices. TCP-SYN-ACK (934) is a SYN message from a local device and ACK of the earlier packet. TCP-ACK (936) helps to confirm to the other side that it has received the SYN.

The second layer between the host 910 and the controller 920 is the NVMe/TCP transport layer 950. To establish the NVMe/TCP transport layer 950, an NVMe/TCP ICReq PDU 952 and an NVMe/TCP ICResp PDU 954 are communicated. NVMe/TCP ICReq PDU 952 is sent from the host to the controller to initialize an NVMe/TCP connection request. For this message, a PDU is sent from a host to a controller to communicate NVMe/TCP connection parameters and establish an NVMe/TCP connection. A NVMe/TCP ICResp PDU 954 is sent from the controller to host to initialize a connection response. For this message, a PDU is sent from a controller to a host to accept a connection request and communicate NVMe/TCP connection parameters.

The third layer between the host 910 and the controller 920 is the NVMe-oF layer 960. For the NVMe-OF layer 960, an NVMe-OF Connect command 962, and an NVMe-oF Connect response 964 are communicated. Before the concatenated instance of TLS is initiated with a handshake, all three of these protocol layers, the TCP transport layer 930, the NVMe/TCP transport layer 950, and the NVMe-oF layer 960, are all established in the clear. Because they are established in the clear, they leave themselves open to attacks from nefarious actors, such as meddler-in-the-middle attacks.

FIG. 10 (Prior Art) is a second flow diagram detailing procedures for setting up a secure channel and NVMe queue between a host and a controller using an NVMe/TCP transport session that incorporates TLS concatenation. After all three of these protocol layers, the TCP transport layer, the NVMe/TCP transport layer, and the NVMe-OF layer, are all established (in the clear) then the DH-HMAC-CHAP Protocol is executed (see 310 of FIG. 3), to perform an NVMe-oF Authentication, and generate a PSK (see 320 of FIG. 3).

First, to recap, in order to establish the TCP transport layer, a TCP handshake takes place. TCP uses a three-way handshake to establish a reliable connection. The connection is full duplex, and both sides synchronize (SYN) and acknowledge (ACK) each other. The exchange is performed in three steps-TCP-SYN (1032), TCP-SYN-ACK (1034), and TCP-ACK (1036)—as shown in FIG. 10. Then to establish the NVMe/TCP transport layer, an NVMe/TCP ICReq PDU 1052 and an NVMe/TCP ICResp PDU 1054 are communicated. Then for the NVMe-OF layer, an NVMe-oF Connect command 1062, and an NVMe-oF Connect response 1064 are communicated.

Moving over to the righthand side of FIG. 10, a DH-HMAC-CHAP Protocol is executed, in order to perform authentication and generate a PSK. First an AUTH_NEGOTIATE message 1070 is sent that consists of an Authorization Send command 1072 from the host to the controller, and an authorization response 1074 from the controller to the host. Then the host sends the controller an Authorization Receive command 1076, and in response the controller sends the DH-HMAC-CHAP Challenge message 1080 to the host. The host sends a DH-HMAC-CHAP_Reply message 1085, which consists of an Authorization Send command 1086 from the host to the controller and an authorization response 1087 from the controller to the host. Then the host sends the controller an Authorization Receive command 1088, and in response the controller sends the DH-HMAC-CHAP_Success1 message 1090 to the host. The host responds with a DH-HMAC-CHAP_Success2 1095 to the controller, after which the controller responds with a response 1096. After this protocol has been executed, both the host and the controller have the same generated PSK.

FIG. 11 (Prior Art) is a third flow diagram detailing procedures for setting up a secure channel and NVMe queue between a host and a controller using an NVMe/TCP transport session that incorporates TLS concatenation. After the three protocol layers, the TCP transport layer 1130, the NVMe/TCP transport layer, 1140 and the NVMe-oF layer 1160, are all established (in the clear), and after a DH-HMAC-CHAP Protocol is in order to generate a PSK (not shown in FIG. 11), then a TLS handshake 1141 occurs to establish a TLS layer between a host 1110 and a controller 1120. The TLS protocol, while established last, effectively inserts a TLS layer 1140 between the TCP transport layer 1130 and the NVMe/TCP transport layer 1140.

First, to recap, in order to establish the TCP transport layer, a TCP handshake 1131 takes place. TCP uses a three-way handshake to establish a reliable connection. The connection is full duplex, and both sides synchronize (SYN) and acknowledge (ACK) each other. The exchange is performed in three steps—TCP-SYN (1132), TCP-SYN-ACK (1134), and TCP-ACK (1136)—as shown in FIG. 11. Then to establish the NVMe/TCP transport layer, an NVMe/TCP ICReq PDU 1152 and an NVMe/TCP ICResp PDU 1154 are communicated. Then for the NVMe-oF layer, an NVMe-oF Connect command 1162, and an NVMe-oF Connect response 1164 are communicated.

The TLS layer 1140 can be established by a TLS handshake 1141 when both sides already possess a generated PSK. The TLS handshake 1141 consists of a ClientHello 1142 from the client to the server, a ServerHello 1144 from the server to the client, and a Finished message 1146 from the client to the server again.

A client can send a ClientHello 1142 message specifying the highest TLS protocol version it supports, a list of supported ciphers in order of the client's preference, and makes a guess on what key algorithm will be used so that it can send a secret key to share if needed. If the client is attempting to perform a resumed handshake, it may send a session ID, but this is prohibited for TLS with NVMe/TCP. By making a guess at what key algorithm will be used, the server eliminates a round trip. After receiving the ClientHello 1142, the server sends a ServerHello 1144 message, containing the chosen protocol version, its key, a certificate, the chosen cipher suite, and then sends another Finished message (not shown in FIG. 11). To confirm or allow resumed handshakes the server may send a session ID. The chosen protocol version should be the highest that both the client and server support. After the client receives the server's other Finished message, it now is coordinated with the server on which cipher suite to use and the client sends Finished message 1146 to the server as a confirmation.

However, this protocol for setting up a secure channel and NVMe queue between a host and a controller using an NVMe/TCP transport session that incorporates TLS concatenation, as detailed in FIGS. 9-11 leaves open multiple problems. First, before the TLS layer is established, there might be buffered data at the server that TLS does not consume as part of the handshake. More specifically, while the specification is operational, the lower transport layers of the connection are being changed by inserting the TLS encryption level. But at that time, it is possible that the driver on host, once the authentication exchange was completed, has begun to start sending commands to the controller. The host might send commands over the administration queue, that is in the process of being changed by the TLS layer. Those commands sent before the TLS layer was established should not be processed, because they are not protected by TLS security. But the commands are being sent to the controller, and the controller processes the commands that are unsecure and sent in the clear. This is a first security problem.

A second security problem with the current protocol is the inability to detect and handle command injection attacks. These attacks are what TLS 1.3 calls "premature application data." A meddler in the middle might be able to determine that the connection between the host and the controller is not secured by TLS yet, and therefore the meddler-in-the-middle can inject nefarious commands while the connection is unsecured. In the current protocol these nefarious commands would be handled and processed, with the host or controller believing that they came from the other party.

A third security problem with the current protocol is that the Connect command is unprotected. Having the Connect command be unprotected also makes meddler-in-the-middle attacks available to nefarious actors. Commands can be injected by a nefarious actor before the TLS handshake, but courtesy of buffering and concurrency on the storage systems, such commands can be processed after the TLS handshake. Processing commands sent before the TLS handshake, sometime after the TLS handshake, is a nasty security problem that must be avoided.

Some embodiments of the present disclosure provide a solution to the problem of not having a unique 1-to-1 unique relationship between the PSK and the PSK-identity. Some of these embodiments define a per-PSK PSK identity in order to provide a unique 1-to-1 relationship. Such a PSK identity can support per-association PSK scope, in some embodiments. In order to accomplish these goals, some embodiments add a digest of the PSK to the PSK identity.

Figure 12:
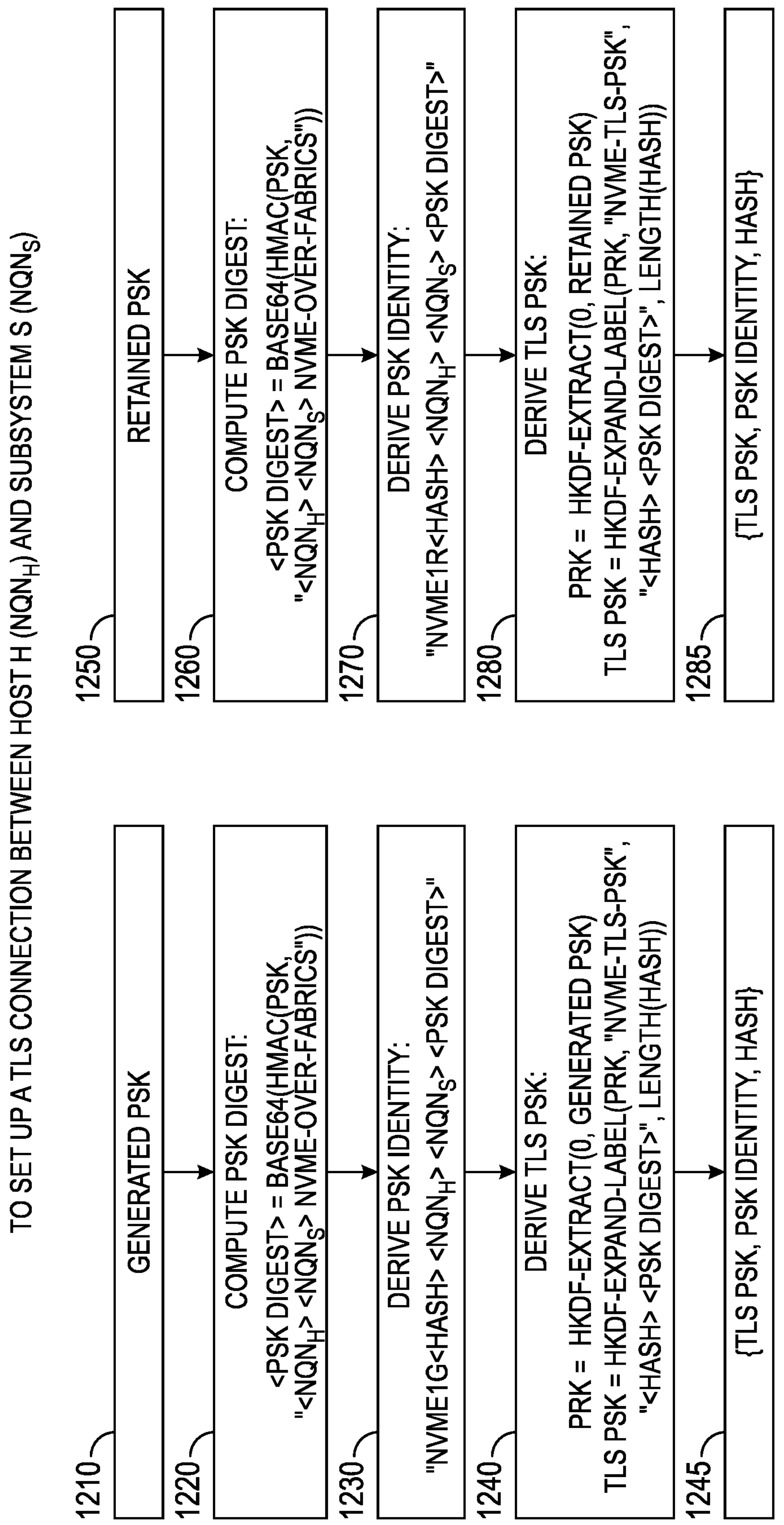
FIG. 12 is an updated flow diagram detailing procedures for the derivation of PSKs and PSK Identities, in order to set up a TLS connection between host $H(NQN_h)$ and subsystem $S(NQN_s)$, according to some embodiments of the present disclosure.

FIG. 12 is an updated flow diagram detailing procedures for the derivation of PSKs and PSK Identities, in order to set up a TLS connection between host H(NQN$_h$) and subsystem S(NQN$_s$), according to some embodiments of the present disclosure. TLS 1.3 has a requirement that each PSK has to be associated with a specific PSK identity, and there has to be a unique relationship, meaning there has to be one identity per each PSK. This is important because the handshake that sets up the TLS channel begins with a "ClientHello" message in which the client specifies that it wants to use a specific PSK and provides the PSK identity to the server. The server looks to see if it has a PSK with that PSK identity, and then starts to use that PSK. Given that the client also has the same PSK, that is the way in which the TLS channel can be set up.

The first method, on the lefthand side, starts with a generated PSK (1210) which is the generated PSK (320) from FIG. 3. The second method, on the righthand side, starts with a retained PSK (1250), which is the retained PSK (350) from FIG. 3. Both methods first compute a new PSK digest (1220, 1260). In order to compute the PSK digest, the procedure uses a secure <hash>associated with the PSK (in form of HMAC). The secure <hash> is a cryptographic one-way function, so HMAC using a specific <hash> is also a cryptographic one-way function. HMAC uses the <hash>twice in a fashion that has more resistance to cryptographic attack than just iterating the hash. Computing the PSK digest depends on the PSK, the identity of the NVMe Host and the identity of the NVMe Subsystem (as HMAC inputs). The formula to compute the PSK digest is as follows: <digest>=Base64(HMAC(PSK, "<NQN$_h$><NQN$_c$>NVMe-over-Fabrics")). The Base64 conversion makes the result printable in ASCII characters.

Both methods then derive a PSK identity (1230, 1270). In order to establish PSK identity uniqueness, some embodiments add the digest to the PSK Identity. The PSK identity can be a string comprising "NVMe1G<hash>NQN$_h$ NQN$_c$<PSK digest>" for the generated PSK, or "NVMe1R<hash>NQN$_h$ NQN$_c$<PSK digest>" for the retained PSK. The "NVMe" part of the string identifies the identity as related to NVMe. The "1" part of the string identifies version 1. The "G" or "R" part of the string identifies whether the input was a generated or retained PSK. The "<hash>" part of the string identifies the hash function to be used. TLS 1.3 specifies the use of at least two fundamental hash function, such as SHA-256 and SHA-384. The "NQNn NQN$_s$" part of the string is the identity of the host and the identity of the subsystem, respectively. The "<PSK digest>" part of the string is the PSK digest that was computed at steps 1220, and 1260, respectively. The resulting PSK Identity uniquely identifies the actual PSK. Deriving the PSK identity by using the PSK digest allow different PSKs to have different digests. Uniqueness is established partly because the hash (HMAC) output size is at least 256 bits, so its use in the PSK identity cryptographically binds the PSK to its PSK Identity. A different PSK produces a different digest hence a different PSK Identity.

Both methods then derive a TLS PSK (1240, 1280). The TLS PSK is derived by first performing an HKDF-Extract function (explained above) on either the generated PSK (430) or the retained PSK (470), in order to generate a Pseudo-Random Key (PRK). Then the TLS PSK is generated using an HKDF-Expand-Label function, with the PRK, the string "NVME-TLS-PSK", a string consisting of "<hash><PSK digest>", and the length of the TLS PSK that is desired to be output. The "<hash>" part of the string identifies the hash function to be used. TLS 1.3 specifies the use of at least two fundamental hash function, such as SHA-256 and SHA-384. The "<PSK digest>" part of the string is the PSK digest that was computed at steps 1220, and 1260, respectively. Finally, the data that the protocol needs is obtained (1245, 1285). The data can include the PSK that will be used by the protocol, its associated identity, and the hash function that will be used this TLS connection.

New functionality, of some embodiments, is enabled by the per-PSK Identities. This new functionality can include, in some embodiments, using different generated PSKs on different controllers, where the PSK Identity uniquely identifies the PSK. In addition, some of these embodiments provide PSK rollover support, where PSK identities distinguish old and new PSKs.

A fundamental property of using a per-PSK PSK identity is that the PSK identity is unique per PSK. Generating a PSK produces a {PSK, PSK-ID} pair. If the resulting {PSK, PSK-ID} pair is used to set up all other queues (Admin and I/O), then we are in the per-entity pair scope case. If the resulting {PSK, PSK-ID} pair is used to set up only the queues belonging to a single association, we are in the per-association scope case. Per-PSK identity facilitates key rollover, which is also applicable for the retained PSK, in addition to the generated PSK, in some embodiments.

Figure 13:
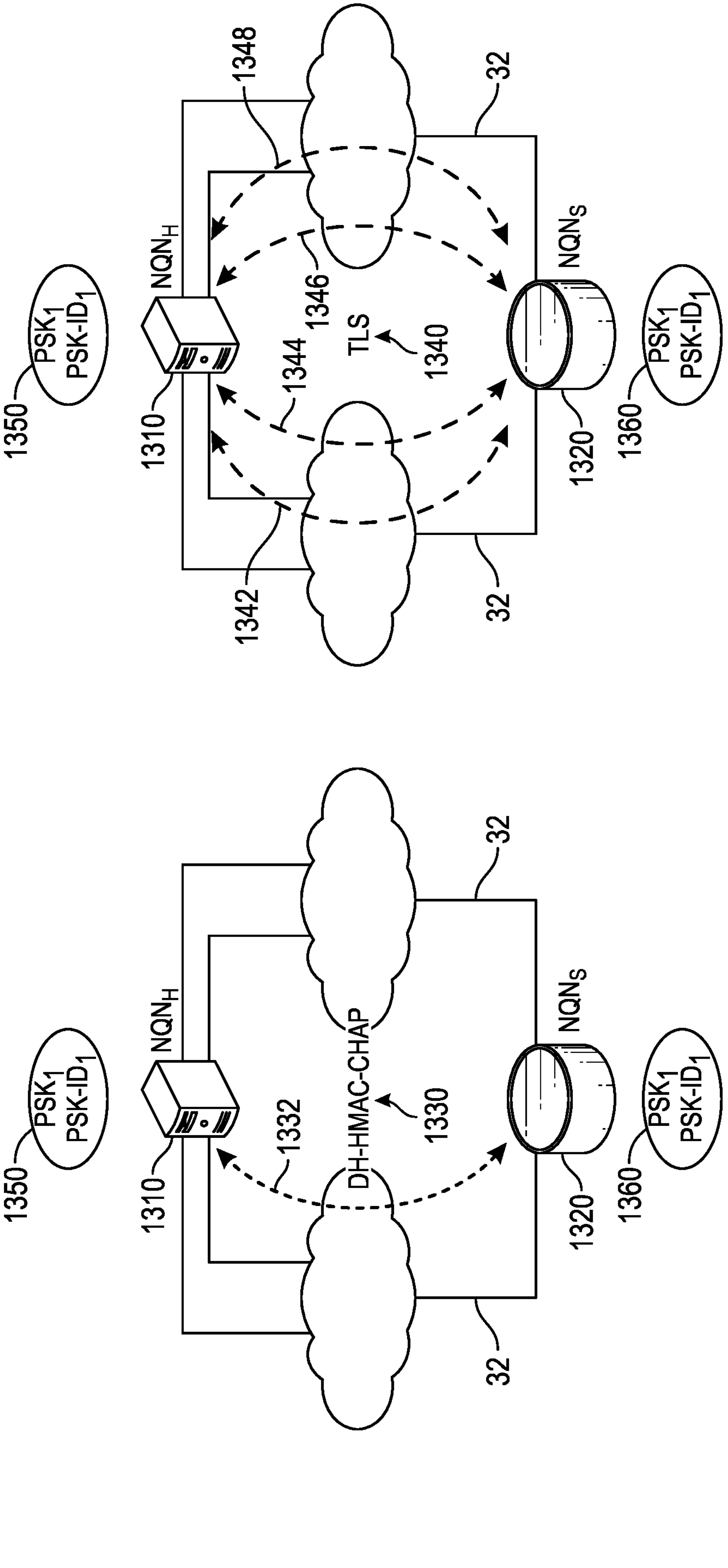
FIG. 13 is a structural diagram depicting a per-PSK PSK-identity supporting a per entity-pair scope, according to some embodiments.

FIG. 13 is a structural diagram depicting a per-PSK PSK-identity supporting a per entity-pair scope, according to some embodiments. With a per entity-pair scope, one DH-HMAC-CHAP authentication transaction 1330 is performed 1332 between the host 1310 (with an identity $NQH_h$) and a controller 1320 (with an identity $NQN_s$). This DH-HMAC-CHAP authentication transaction 1330 generates one PSK. PSK-identity pair denoted as $PSK_1$, $PSK\text{-}ID_1$ (1350, 1360). This PSK, PSK-identity pair (1350, 1360) is then used to set up all the TLS(1340) channels (1342, 1344, 1346, 1348) between the host 1310 and the controller 1320.

Figure 14:
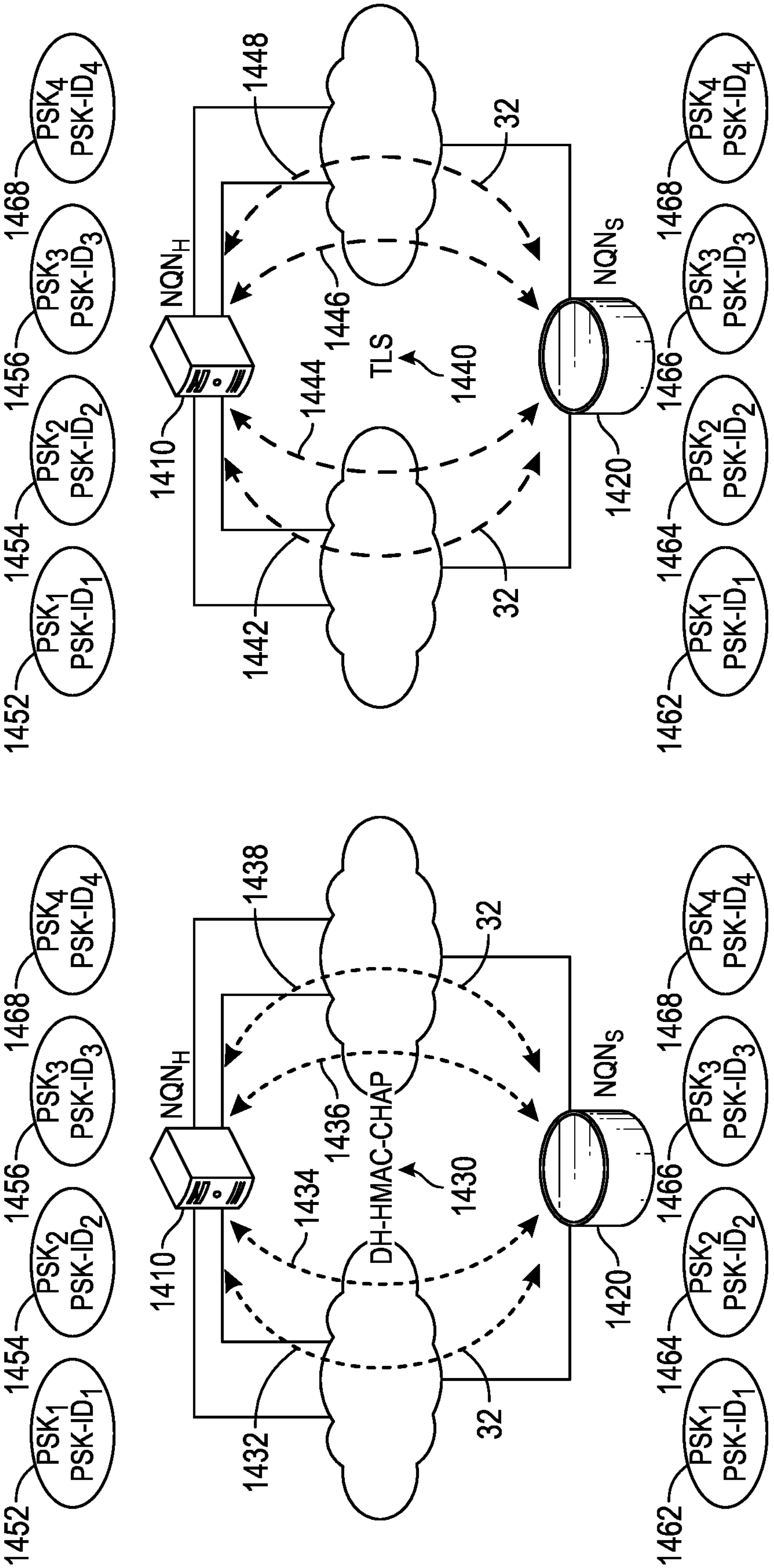
FIG. 14 is a structural diagram depicting a per-PSK PSK-identity supporting a per association scope, according to some embodiments.

FIG. 14 is a structural diagram depicting a per-PSK PSK-identity supporting a per association scope, according to some embodiments. With a per association scope, one DH-HMAC-CHAP authentication transaction 1430 is performed between the host 1410 (with an identity $NQH_h$) and a controller 1420 (with an identity $NQN_s$) for each TLS (1440) channel. A first DH-HMAC-CHAP authentication transaction 1432 generates a first PSK, PSK-identity pair denoted as $PSK_1$, $PSK\text{-}ID_1$ (1452, 1462). This PSK, PSK-identity pair (1452, 1462) is then used to set up a first TLS channel (1442) between the host 1410 and the controller 1420. A second DH-HMAC-CHAP authentication transaction 1434 generates a second PSK, PSK-identity pair denoted as $PSK_2$, $PSK\text{-}ID_2$ (1454, 1464). This PSK, PSK-identity pair (1454, 1464) is then used to set up a second TLS channel (1444) between the host 1410 and the controller 1420. A third DH-HMAC-CHAP authentication transaction 1436 generates a third PSK. PSK-identity pair denoted as $PSK_3$, $PSK\text{-}ID_3$ (1456, 1466). This PSK, PSK-identity pair (1456, 1466) is then used to set up a third TLS channel (1446) between the host 1410 and the controller 1420. A fourth DH-HMAC-CHAP authentication transaction 1438 generates a fourth PSK. PSK-identity pair denoted as $PSK_4$, $PSK\text{-}ID_4$ (1458, 1468). This PSK, PSK-identity pair (1458, 1468) is then used to set up a fourth TLS channel (1448) between the host 1410 and the controller 1420.

Other embodiments of the present disclosure provide solutions to the problems created by TLS concatenation, including the buffered data at the server that TLS does not consume as part of the handshake before TLS is established, the failure to detect and handle command injection attacks, and the fact that the Connect command unprotected. In order to fix TLS concatenation on the administration queue, an explicit disconnect can be implemented. After a PSK is generated, the TCP connection can be explicitly disconnected, in some embodiments. This explicit disconnect prevents NVMe commands that are sent while the TLS handshake is ongoing (premature application data) from being executed. For the second TCP connection, the Admin Queue starts directly in TLS, as do all the I/O Queues.

Therefore, some embodiments of the present disclosure can provide a solution to the TLS concatenation problems by changing to a second TCP connection. These embodiments can perform a TCP disconnect, which remove the first TCP connection after generating a PSK. These embodiments can then perform a TCP reconnect, which starts a second TCP connection, using the generated PSK to start the TLS handshake. What happens to unexpected non-TLS traffic? Non-TLS traffic becomes stranded on the first TCP connection (socket) because the second TCP connection uses a different TCP source port. This traffic is discarded by teardown/cleanup of the first TCP connection (socket), thereby robustly assuring discard.

Some embodiments of the present disclosure can provide a second solution to the TLS concatenation problems by closing the second connection if unexpected non-TLS traffic occurs. This is a simpler check because the second TCP connection starts with TLS handshake. A TLS alert can be sent (if appropriate) before closing TCP connection, in some embodiments.

Figure 15:
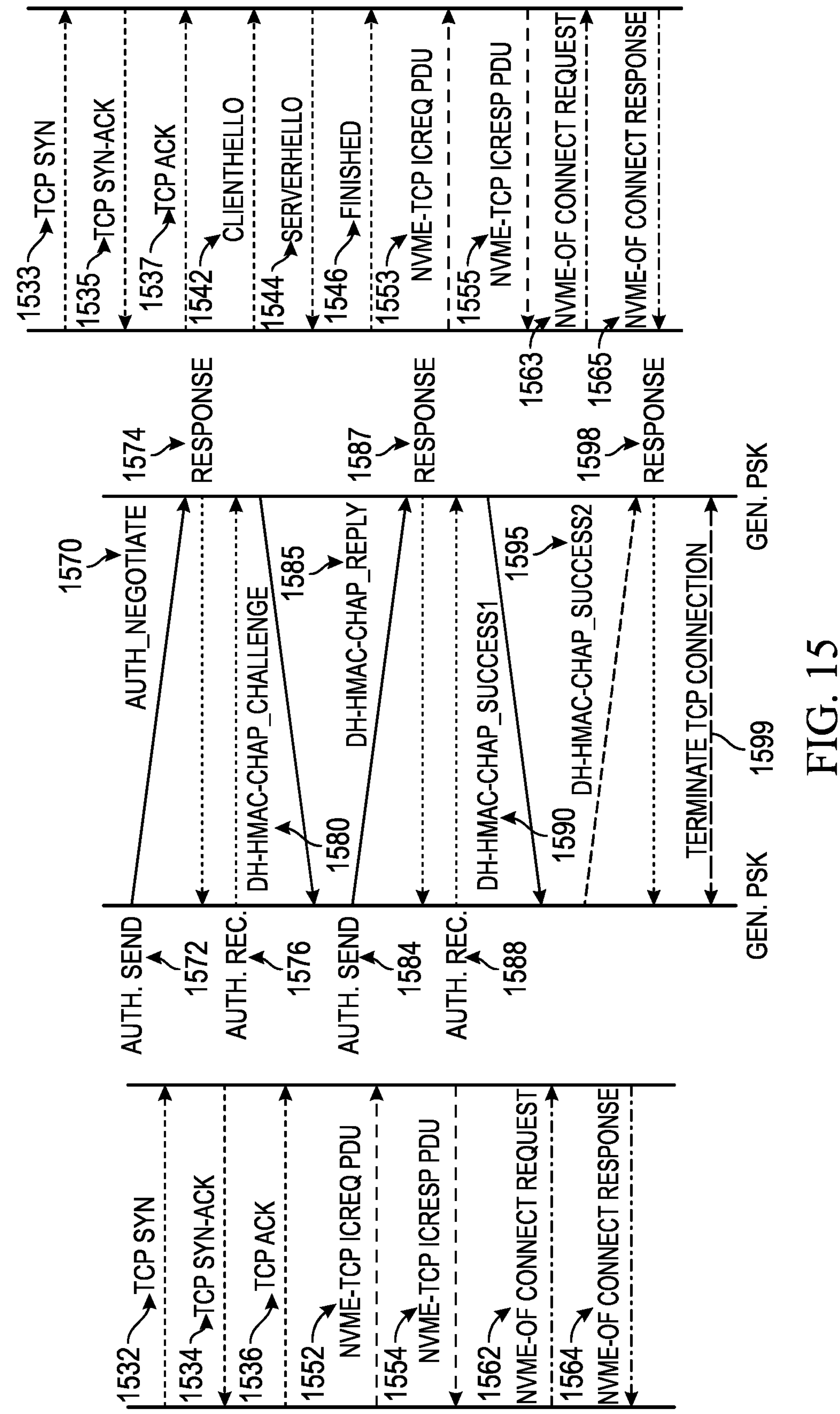
FIG. 15 is a flow diagram detailing procedures for setting up a secure channel and NVMe queue between a host and a controller using an NVMe/TCP transport session that incorporates a solution to the TLS concatenation problems by changing to a second TCP connection, according to some embodiments.

FIG. 15 is a flow diagram detailing procedures for setting up a secure channel and NVMe queue between a host and a controller using an NVMe/TCP transport session that incorporates a solution to the TLS concatenation problems by changing to a second TCP connection, according to some embodiments.

First, to recap, in order to establish the TCP transport layer, a TCP handshake takes place. TCP uses a three-way handshake to establish a reliable connection. The connection is full duplex, and both sides synchronize (SYN) and acknowledge (ACK) each other. The exchange is performed in three steps—TCP-SYN (1532), TCP-SYN-ACK (1534), and TCP-ACK (1536)—as shown in FIG. 15. Then to establish the NVMe/TCP transport layer, an NVMe/TCP ICReq PDU 1552 and an NVMe/TCP ICResp PDU 1554 are communicated. Then for the NVMe-oF layer, an NVMe-oF Connect command 1562, and an NVMe-oF Connect response 1564 are communicated.

Moving over to the middle diagram of FIG. 15, a DH-HMAC-CHAP Protocol is executed, in order to perform authentication and generate a PSK. First an AUTH_NEGOTIATE message 1570 is sent that consists of an Authorization Send command 1572 from the host to the controller and an authorization response 1574 from the controller to the host. Then the host sends the controller an Authorization Receive command 1576, and in response the controller sends the DH-HMAC-CHAP Challenge message 1580 to the host. The host sends a DH-HMAC-CHAP_Reply message 1585, which consists of an Authorization Send command 1586 from the host to the controller and an authorization response 1587 from the controller to the host. Then the host sends the controller an Authorization Receive command 1588, and in response the controller sends the DH-HMAC-CHAP_Success1 message 1590 to the host. The host responds with a DH-HMAC-CHAP_Success2 1595 to the controller, after which the controller responds with a response 1596. After this protocol has been executed, both the host and the controller have the same generated PSK. Then this first TCP connection is terminated (1599).

A second TCP connection is established, and this connection is immediately secured with a TLS handshake before establishing the NVMe or the NVMe-OF layers. First, in order to establish the TCP transport layer, a TCP handshake takes place. TCP uses a three-way handshake to establish a reliable connection. The connection is full duplex, and both sides synchronize (SYN) and acknowledge (ACK) each other. The exchange is performed in three steps—TCP-SYN (1533), TCP-SYN-ACK (1535), and TCP-ACK (1537)—as shown in FIG. 15. The TLS layer can be established by a TLS handshake when both sides already possess a generated PSK. The TLS handshake consists of a ClientHello 1542 from the client to the server, a ServerHello 1544 from the server to the client, and a Finished message 1546 from the client to the server again. Then to establish the NVMe/TCP transport layer, an NVMe/TCP ICReq PDU 1553 and an NVMe/TCP ICResp PDU 1555 are communicated. Then for the NVMe-OF layer, an NVMe-oF Connect command 1563, and an NVMe-oF Connect response 1565 are communicated.

Figure 16:
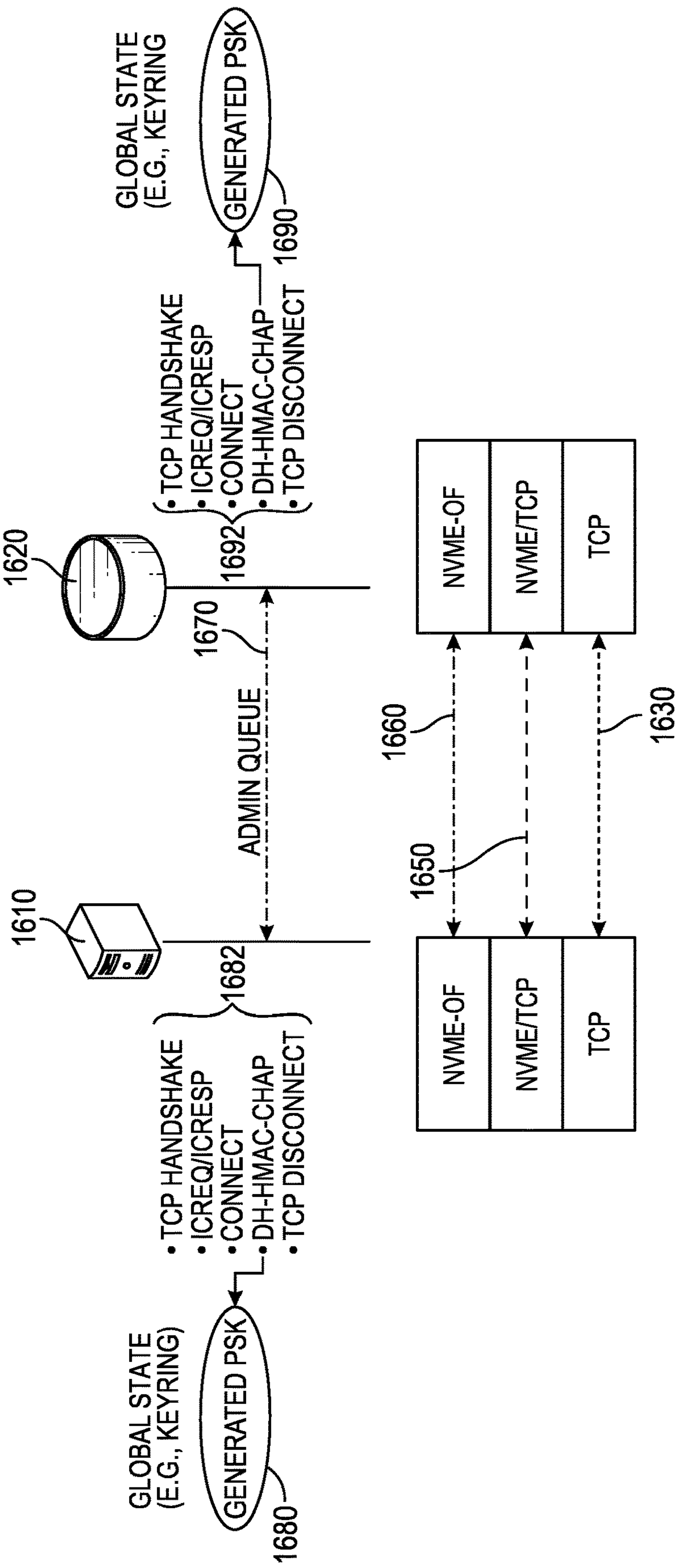
FIG. 16 is a first of two flow diagrams detailing procedures for setting up a secure channel and NVMe queue between a host and a controller using an NVMe/TCP transport session that incorporates a solution to the TLS concatenation problems by changing to a second TCP connection, according to some embodiments.

FIG. 16 is a first of two flow diagrams detailing procedures for setting up a secure channel and NVMe queue between a host 1610 and a controller 1620 using an NVMe/TCP transport session that incorporates a solution to the TLS concatenation problems by changing to a second TCP connection 1630, according to some embodiments. At steps 1682 and 1692 the host and the controller, respectively, each perform a TCP handshake, an ICReq and an ICResp to setup an NVMe/TCP transport layer 1650, a Connect command and response to setup up the NVMe admin queue 1670 and associate the host to the controller for the NVMe-OF layer 1660, and a DH-HMAC-CHAP authentication transaction to generate a PSK (1680, 1690). Then an explicit TCP disconnect is performed (1682, 1692).

Figure 17:
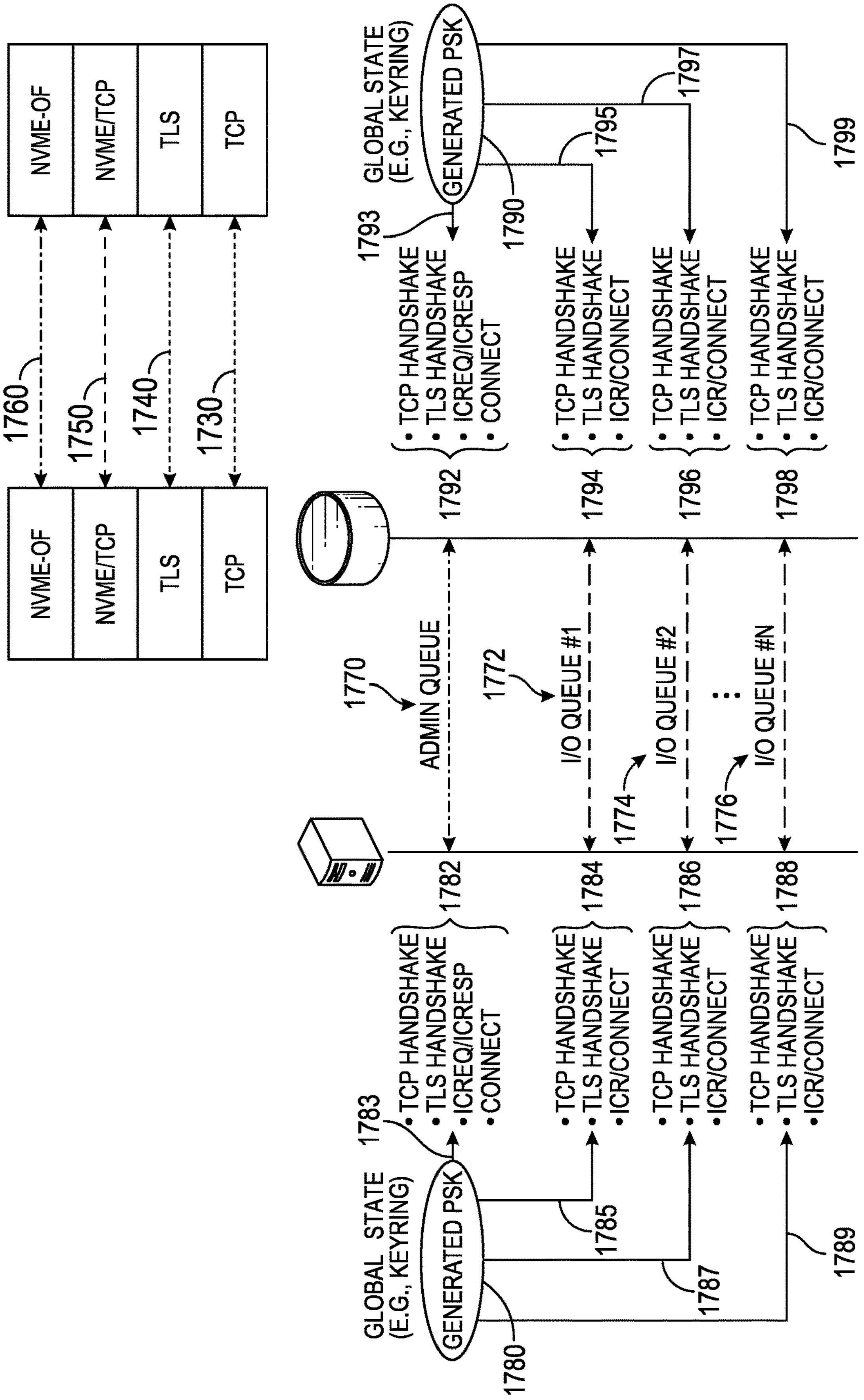
FIG. 17 is a second of two flow diagrams detailing procedures for setting up a secure channel and NVMe queue between a host and a controller using an NVMe/TCP transport session that incorporates a solution to the TLS concatenation problems by changing to a second TCP connection, according to some embodiments.

FIG. 17 is a second of two flow diagrams detailing procedures for setting up a secure channel and NVMe queue between a host and a controller using an NVMe/TCP transport session that incorporates a solution to the TLS concatenation problems by changing to a second TCP connection 1730, according to some embodiments. At steps 1782 and 1792 the host and the controller, respectively, each perform a TCP handshake. Then a generated PSK (1780, 1790), that was generated in FIG. 16 (1680, 1690 of FIG. 16) is used directly to set up the Admin Queue (1770), and all of the I/O Queues (1772, 1774, 1776). The generated PSK (1780, 1790) is used (1783, 1793) for the TLS handshake of the Admin Queue 1770 in order to set up a TLS layer 1740. Then an ICReq and an ICResp are performed to set up an NVMe/TCP transport layer 1750, and a Connect command and response to associate the host to the controller for the NVMe-oF layer 1760.

To set up I/O Queue #1 (1772) the host performs steps 1784 while the controller performs steps 1794. A TCP handshake is performed. Then a TLS handshake is performed using (1785, 1795) the generated PSK (1780, 1790). Then a Connect command and response occurs to set up the NVMe Queue and associate the host to the controller. To set up I/O Queue #2 (1774) the host performs steps 1786 while the controller performs steps 1796. A TCP handshake is performed. Then a TLS handshake is performed using (1787, 1797) the generated PSK (1780, 1790). Then a Connect command and response occurs to set up the NVMe Queue and associate the host to the controller. To set up I/O Queue #N (1776) the host performs steps 1788 while the controller performs steps 1798. A TCP handshake is performed. Then a TLS handshake is performed using (1789, 1799) the generated PSK (1780, 1790). Then a Connect command and response occurs to set up the NVMe Queue and associate the host to the controller.

Figure 18:
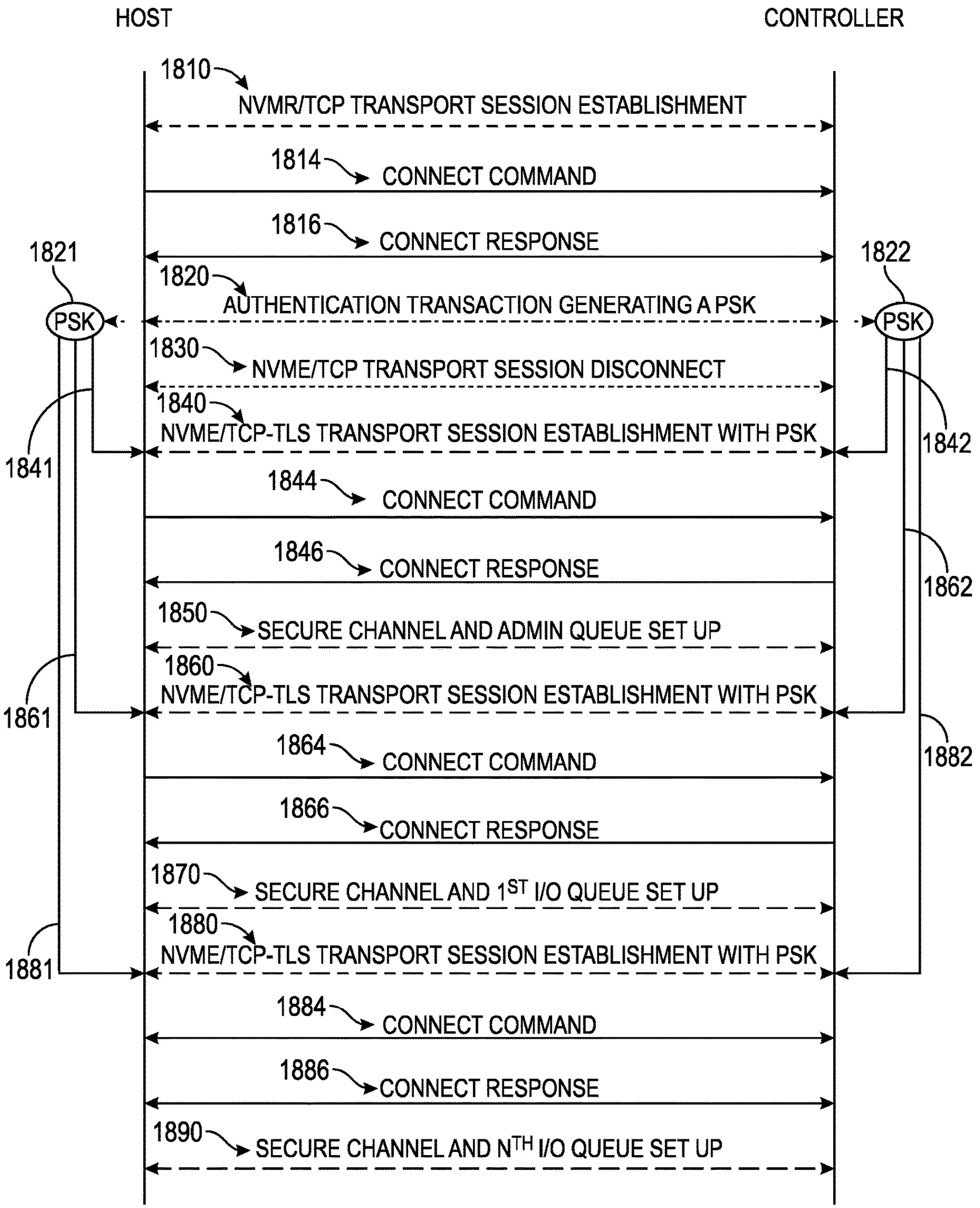
FIG. 18 is another flow diagrams detailing procedures for setting up a secure channel, and NVMe queue between a host and a controller using an NVMe/TCP transport session, that incorporates a solution to the TLS concatenation problems by changing to a second TCP connection, according to some embodiments.

FIG. 18 is another flow diagrams detailing procedures for setting up a secure channel, and NVMe queue between a host and a controller using an NVMe/TCP transport session, that incorporates a solution to the TLS concatenation problems by changing to a second TCP connection, according to some embodiments.

First, an NVMe/TCP transport session is established (1810) between a host and a controller. Then a Connect command and response is performed, comprising a Connect command 1814 and a Connect response 1816, to set up an Admin Queue and associate host to controller. Then, an authentication transaction 1820 generating a PSK (1821, 1822) between host and controller is performed. Then, the first NVMe/TCP transport session is disconnected 1830.

After the first NVMe/TCP transport session is disconnected 1830, then the rest of the flowchart occurs. First, an NVMe/TCP-TLS transport session is established 1840 using (1841, 1842) the generated PSK (1821, 1822). Then the Connect command and response, comprising a Connect command 1844 and a Connect response 1846, is performed to set up an Admin Queue and associate host to controller. Then, a secure channel and admin queue are set up 1850. Second, an NVMe/TCP-TLS transport session is established 1860 using (1861, 1862) the generated PSK (1821, 1822). Then, the Connect command and response is performed, comprising a Connect command 1864 and a Connect response 1866, to set up the first I/O Queue of the established association. Then a secure channel and a $1^{st}$ I/O queue are set up 1870. Third, an NVMe/TCP-TLS transport session is established 1880 using (1881, 1882) the generated PSK (1821, 1822). The Connect command and response is performed, comprising a Connect command 1884 and a Connect response 1886, to set up the $N^{th}$ I/O Queue of the established association. Then a secure channel and $N^{th}$ I/O queue are set up 1890.

Other embodiments of the present disclosure can provide other solutions to the problems created by TLS concatenation, including the buffered data between TCP socket and security library before TLS is established, the failure to detect and handle command injection attacks, and the fact that the Connect command unprotected. These embodiments can use new AUTH_Negotiate secure channel concatenation ("SC_C") values to define the new TLS concatenation behavior. FIG. 19 provides a chart 1900 listing updated AUTH_Negotiate SC_C Values 1910, their description 1920, and their transport applicability 1930, to define the new TLS concatenation behavior.

An SC_C value of 00h (1940) means "NOSC" which provides no secure channel concatenation. An authentication transaction with SC_C=NOSC is allowed on any Admin or I/O Queue and does not generate a PSK (i.e., it performs authentication only). An SC_C value of 01h (1950) is obsolete.

An SC_C value of 02h (1960) means "NEWTLSPSK." "NEWTLSPSK" is used on an Admin Queue over a TCP channel without TLS to generate a PSK and associated PSK identity. This {PSK, PSK Identity} pair may be used to set up TLS secure channels for subsequent Admin and I/O queues. An authentication transaction with SC_C =NEWTLSPSK is allowed on an Admin Queue over a TCP channel without TLS and generates a new PSK, is prohibited on an I/O Queue over a TCP channel without TLS, and is prohibited on an Admin Queue or I/O queue over a TLS secure channel, in some embodiments.

An SC_C value of 03h (1970) means "REPLACETLSPSK." "REPLACETLSPSK" is used on an Admin Queue over a TLS secure channel to generate a PSK and associated PSK identity. This {PSK, PSK Identity} pair replaces the {PSK, PSK Identity} pair that was used to set up the TLS secure channel over which the authentication transaction is performed. An authentication transaction with SC_C=REPLACETLSPSK is allowed on an Admin Queue over a TLS secure channel and replaces the association's PSK, is prohibited on an Admin Queue or I/O queue over a TCP channel without TLS, and is prohibited on an I/O Queue over a TLS secure channel, in some embodiments. All other SC_C values 1980 are reserved.

In the ClientHello message of the TLS handshake the host specifies the PSK identity of the PSK it intends to use. If that PSK is not available on the subsystem when the host is setting up the TLS secure channel for an I/O Queue belonging to an existing secured association (i.e., an association with the Admin Queue over a TLS channel), this means that PSK expired on the subsystem and needs to be replaced. That TLS connection for an I/O Queue shall be closed and the host shall perform a DH-HMAC-CHAP reauthentication with SC_C=REPLACETLSPSK over the Admin Queue of that association. This is done to generate a {PSK, PSK-ID} pair to use in place of the {PSK, PSK-ID} pair that was used to set up the Admin Queue secure channel over which the DH-HMAC-CHAP transaction is performed.

If that PSK is not available on the subsystem when the host is setting up the TLS secure channel for the Admin Queue of a new association (e.g., the subsystem does not support global scope generated PSK), this means that a new PSK needs to be generated for the new association. That TLS connection for a new Admin Queue shall be closed and the host shall instantiate an Admin Queue over an unsecured TCP session and perform there a DH-HMAC-CHAP transaction with SC_C=NEWTLSPSK. This is done to generate a new {PSK, PSK-ID} pair useable for that new association. Upon completing the authentication transaction, that TCP connection shall be closed and the newly generated PSK shall be used to set up the desired secured Admin Queue, as shown in FIG. 18.

Figure 20:
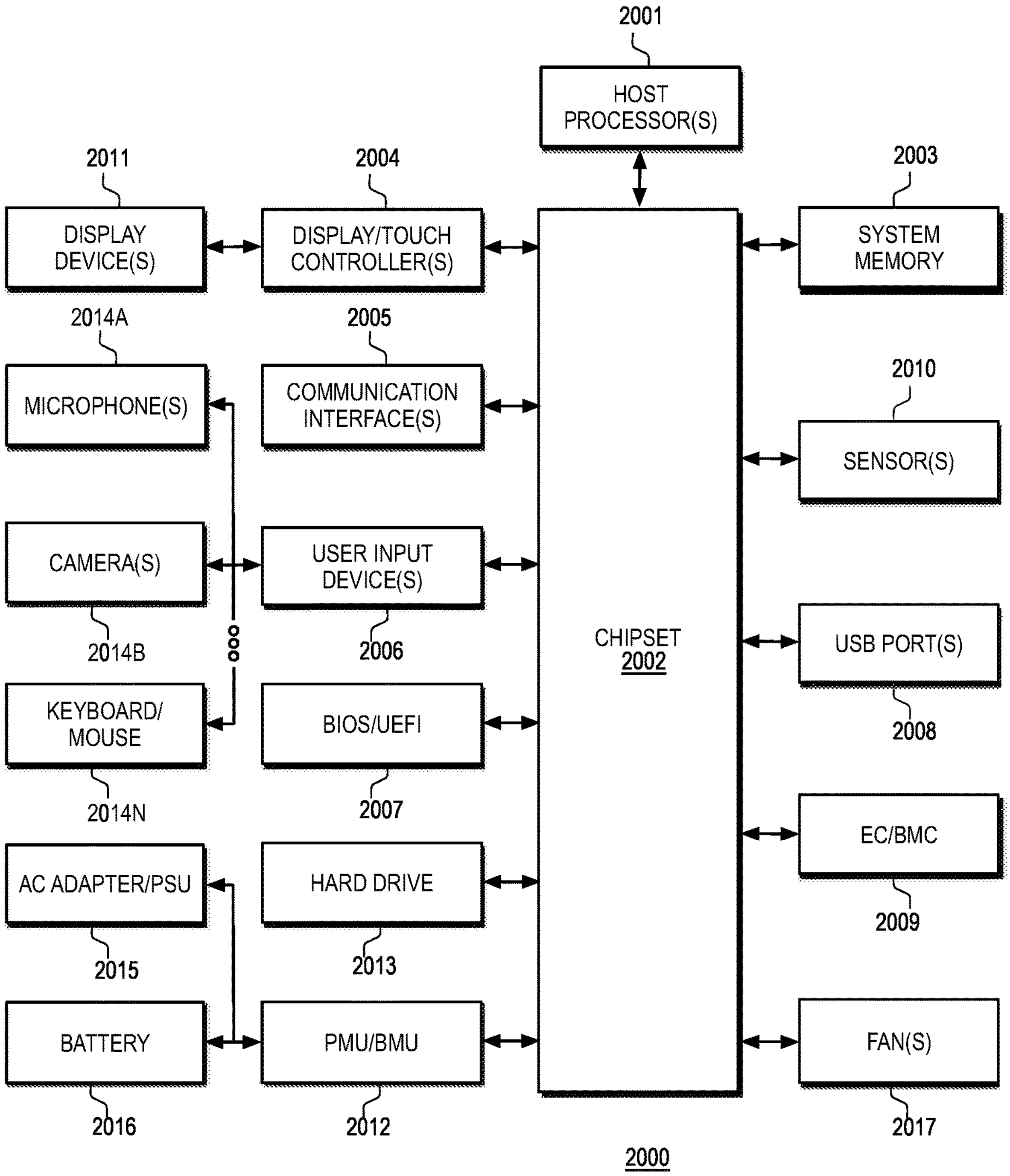
FIG. 20 is a diagram illustrating an example of an environment where systems and methods for determining a pre-shared key (PSK) identity for Transport Layer Security (TLS), and for providing a new TLS concatenation using explicit disconnect described herein may be implemented, according to some embodiments.

FIG. 20 is a diagram illustrating an example of an environment where systems and methods described herein may be implemented, according to some embodiments. FIG. 20 is a block diagram of hardware components of IHS 2000, which may be used to implement storage system attack detection and response.

As depicted, IHS 2000 includes host processor(s) 2001. In various embodiments, IHS 2000 may be a single-processor system, or a multi-processor system including two or more processors. Host processor(s) 2001 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 2000 includes chipset 2002 coupled to host processor(s) 2001. Chipset 2002 may provide host processor(s) 2001 with access to several resources. In some cases, chipset 2002 may utilize a QuickPath Interconnect (QPI) bus to communicate with host processor(s) 2001.

Chipset 2002 may also be coupled to communication interface(s) 2005 to enable communications between IHS 2000 and various wired and/or wireless networks, such as Ethernet, WiFi, BLUETOOTH(BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 2005 may also be used to communicate with certain peripherals devices (e.g., BT speakers, microphones, headsets, etc.). Moreover, communication interface(s) 2005 may be coupled to chipset 2002 via a Peripheral Component Interconnect Express (PCIe) bus, or the like.

Chipset 2002 may be coupled to display/touch controller(s) 2004, which may include one or more Graphics Processor Units (GPUs) on a graphics bus, such as an Accelerated Graphics Port (AGP) or PCIe bus. As shown, display/touch controller(s) 2004 provide video or display signals to one or more display device(s) 2011.

Display device(s) 2011 may include Liquid Crystal Display (LCD), Light Emitting Diode (LED), organic LED (OLED), or other thin film display technologies. Display device(s) 2011 may include a plurality of pixels arranged in a matrix, configured to display visual information, such as text, two-dimensional images, video, three-dimensional images, etc. In some cases, display device(s) 2011 may be provided as a single continuous display, or as two or more discrete displays.

Chipset 2002 may provide host processor(s) 2001 and/or display/touch controller(s) 2004 with access to system memory 2003. In various embodiments, system memory 2003 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 2002 may also provide host processor(s) 2001 with access to one or more Universal Serial Bus (USB) ports 2008, to which one or more peripheral devices may be coupled (e.g., integrated or external webcams, microphones, speakers, etc.).

Chipset 2002 may further provide host processor(s) 2001 with access to one or more hard disk drives, solid-state drives, optical drives, or other removable-media drives 2013.

Chipset 2002 may also provide access to one or more user input devices 2006, for example, using a super I/O controller or the like. Examples of user input devices 2006 include, but are not limited to, microphone(s) 2014A, camera(s) 2014B, and keyboard/mouse 2014N. Other user input devices 2006 may include a touchpad, stylus or active pen, totem, etc.

Each of user input devices 2006 may include a respective controller (e.g., a touchpad may have its own touchpad controller) that interfaces with chipset 2002 through a wired or wireless connection (e.g., via communication interfaces(s) 2005). In some cases, chipset 2002 may also provide access to one or more user output devices (e.g., video projectors, paper printers, 3D printers, loudspeakers, audio headsets, Virtual/Augmented Reality (VR/AR) devices, etc.)

In certain embodiments, chipset 2002 may further provide an interface for communications with hardware sensors 2010.

Sensors 2010 may be disposed on or within the chassis of IHS 2000, or otherwise coupled to IHS 2000, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 2000, host processor(s) 2001 may utilize program instructions of Basic Input/Output System (BIOS) 2007 to initialize and test hardware components coupled to IHS 2000 and to load host OS for use by IHS 2000. BIOS 2007 provides an abstraction layer that allows host OS to interface with certain IHS components 2000. Relying upon the hardware abstraction layer provided by BIOS 2007, software stored in system memory 2003 and executed by host processor(s) 2001 can interface with certain I/O devices that are coupled to IHS 2000.

The Unified Extensible Firmware Interface (UEFI) was designed as a successor to BIOS. As a result, many modern IHSs utilize UEFI in addition to or instead of a BIOS. As used herein, BIOS 2007 is intended to also encompass a UEFI component.

Embedded Controller (EC) or Baseboard Management Controller (BMC) 2009 is operational from the very start of each IHS power reset and handles various tasks not ordinarily handled by host processor(s) 2001. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 2012, alternating current (AC) adapter/Power Supply Unit (PSU) 2015 and/or battery 2016, allowing remote diagnostics and remediation over network(s) 103, etc.

For example, EC/BMC 2009 may implement operations for interfacing with power adapter/PSU 2015 in managing power for IHS 2000. Such operations may be performed to determine the power status of IHS 2000, such as whether IHS 2000 is operating from AC adapter/PSU 2015 and/or battery 2016.

Firmware instructions utilized by EC/BMC 2009 may also be used to provide various core operations of IHS 2000, such as power management and management of certain modes of IHS 2000 (e.g., turbo modes, maximum operating clock frequencies of certain components, etc.).

In addition, EC/BMC 2009 may implement operations for detecting certain changes to the physical configuration or posture of IHS 2000. For instance, when IHS 2000 as a 2-in-1 laptop/tablet form factor, EC/BMC 2009 may receive inputs from a lid position or hinge angle sensor 2010, and it may use those inputs to determine: whether the two sides of IHS 2000 have been latched together to a closed position or a tablet position, the magnitude of a hinge or lid angle, etc. In response to these changes, the EC may enable or disable certain features of IHS 2000 (e.g., front or rear facing camera, etc.).

In some cases, EC/BMC 2009 may be configured to identify any number of IHS postures, including, but not limited to: laptop, stand, tablet, tent, or book. For example, when display(s) 2011 of IHS 2000 is open with respect to a horizontal keyboard portion, and the keyboard is facing up, EC/BMC 2009 may determine IHS 2000 to be in a laptop posture. When display(s) 2011 of IHS 2000 is open with respect to the horizontal keyboard portion, but the keyboard is facing down (e.g., its keys are against the top surface of a table), EC/BMC 2009 may determine IHS 2000 to be in a stand posture.

When the back of display(s) 2011 is closed against the back of the keyboard portion, EC/BMC 2009 may determine IHS 2000 to be in a tablet posture. When IHS 2000 has two display(s) 2011 open side-by-side, EC/BMC 2009 may determine IHS 2000 to be in a book posture. When IHS 2000 has two displays open to form a triangular structure sitting on a horizontal surface, such that a hinge between the displays is at the top vertex of the triangle, EC/BMC 2009 may determine IHS 2000 to be in a tent posture. In some implementations, EC/BMC 2009 may also determine if display(s) 2011 of IHS 2000 are in a landscape or portrait orientation.

In some cases, EC/BMC 2009 may be installed as a Trusted Execution Environment (TEE) component to the motherboard of IHS 2000.

Additionally, or alternatively, EC/BMC 2009 may be configured to calculate hashes or signatures that uniquely identify individual components of IHS 2000. In such scenarios, EC/BMC 2009 may calculate a hash value based on the configuration of a hardware and/or software component coupled to IHS 2000. For instance, EC/BMC 2009 may calculate a hash value based on all firmware and other code or settings stored in an onboard memory of a hardware component.

Hash values may be calculated as part of a trusted process of manufacturing IHS 2000 and may be maintained in secure storage as a reference signature. EC/BMC 2009 may later recalculate the hash value for a component may compare it against the reference hash value to determine if any modifications have been made to the component, thus indicating that the component has been compromised. In this manner, EC/BMC 2009 may validate the integrity of hardware and software components installed in IHS 2000.

In various embodiments, IHS 2000 may be coupled to an external power source (e.g., AC outlet or mains) through AC adapter/PSU 2015. AC adapter/PSU 2015 may include an adapter portion having a central unit (e.g., a power brick, wall charger, or the like) configured to draw power from an AC outlet via a first electrical cord, convert the AC power to direct current (DC) power, and provide DC power to IHS 2000 via a second electrical cord.

Additionally, or alternatively, AC adapter/PSU 2015 may include an internal or external power supply portion (e.g., a switching power supply, etc.) connected to the second electrical cord and configured to convert AC to DC. AC adapter/PSU 2015 may also supply a standby voltage, so that most of IHS 2000 can be powered off after preparing for hibernation or shutdown, and powered back on by an event (e.g., remotely via wake-on-LAN, etc.). In general, AC adapter/PSU 2015 may have any specific power rating, measured in volts or watts, and any suitable connectors.

IHS 2000 may also include internal or external battery 2016. Battery 2016 may include, for example, a Lithium-ion or Li-ion rechargeable device capable of storing energy sufficient to power IHS 2000 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 2012 governs power functions of IHS 2000, including AC adapter/PSU 2015 and battery 2016. For example, PMU 2012 may be configured to: monitor power connections and battery charges, charge battery 2016, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 2012 may include one or more Power Management Integrated Circuits (PMICs) configured to control the flow and direction or electrical power in IHS 2000. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 2012 may include a Battery Management Unit (BMU) (referred to collectively as "PMU/BMU 2012"). AC adapter/PSU 2015 may be removably coupled to a battery charge controller within PMU/BMU 2012 to provide IHS 2000 with a source of DC power from battery cells within battery 2016 (e.g., a lithium ion (Li-ion) or nickel metal hydride (NiMH) battery pack including one or more rechargeable batteries). PMU/BMU 2012 may include non-volatile memory and it may be configured to collect and store battery status, charging, and discharging information, and to provide that information to other IHS components.

Examples of information collected and stored in a memory within PMU/BMU 2012 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 2012. Power draw data may also be monitored with respect to individual components or devices of IHS 2000. Whenever applicable, PMU/BMU 2012 may administer the execution of a power policy, or the like.

IHS 2000 may also include one or more fans 2017 configured to cool down one or more components or devices of IHS 2000 disposed inside a chassis, case, or housing. Fan(s) 2017 may include any fan inside, or attached to, IHS 2000 and used for active cooling. Fan(s) 2017 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 2000 may not include all the components shown in FIG. 20. In other embodiments, IHS 2000 may include other components in addition to those that are shown in FIG. 20. Furthermore, some components that are represented as separate components in FIG. 20 may instead be integrated with other components, such that all or a portion of the operations executed by the illustrated components may instead be executed by the integrated component.

For example, in various embodiments described herein, host processor(s) 2001 and/or other components of IHS 2000 (e.g., chipset 2002, display/touch controller(s) 2004, communication interface(s) 2005, EC/BMC 2009, etc.) may be replaced by discrete devices within a heterogenous computing platform (e.g., a System-On-Chip or "SoC"). As such, IHS 2000 may assume different form factors including, but not limited to: servers, workstations, desktops, laptops, appliances, video game consoles, tablets, smartphones, etc.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:

a processor; and a memory coupled to the processor, wherein the memory comprises program instructions stored thereon that, upon execution by the processor, cause the IHS to:

derive a shared session key during a first Transmission Control Protocol (TCP) connection with a second IHS;

after disconnection of the first TCP connection, perform a Transport Layer Security (TLS) negotiation with the second IHS via a second TCP connection using the shared session key;

attempt to perform a second TLS negotiation with the second IHS for a third TCP connection using the shared session key;

determine that the shared session key is not available on the second IHS;

perform an authentication transaction via the second TCP connection comprising a secure channel concatenation value usable on an administration queue over a TLS secure channel to generate a second shared session key, wherein the second shared session key replaces the shared session key for subsequent TLS negotiations; and perform the second TLS negotiation with the second IHS for the third TCP connection using the second shared session key.

2. The IHS of claim 1, wherein the TLS negotiation for the second TCP connection is performed to establish an administration queue.

3. The IHS of claim 1, wherein the program instructions, upon execution by the processor, further cause the IHS to:

perform a third TLS negotiation with the second IHS via a fourth TCP connection using the shared session key; and establish a second I/O queue based, at least in part, on the third TLS negotiation.

4. The IHS of claim 1, wherein the first TCP connection is a Non-Volatile Memory Express (NVMe) TCP connection, and wherein the second TCP connection is an NVMe TCP connection using TLS.

5. The IHS of claim 1, wherein the shared session key with the second IHS is derived by a first authentication transaction, and wherein the first authentication transaction uses a Diffie-Hellman (DH) hash-based message authentication code (HMAC) Challenge-Handshake Authentication Protocol (CHAP).

6. The IHS of claim 1, wherein the second TCP connection uses a different TCP source port than the first TCP connection, and wherein unexpected non-TLS traffic of the first TCP connection is stranded by the disconnect of the first TCP connection.

7. The IHS of claim 1, wherein the shared session key with the second IHS is derived by a first authentication transaction, and wherein the first authentication transaction comprises a secure channel concatenation value usable on an administration queue over a TCP channel without TLS to generate a new shared session key.

8. The IHS of claim 1, wherein the TLS negotiation for the second TCP connection is performed to establish an administration queue, and wherein the program instructions, upon execution by the processor, further cause the IHS to:

perform an authentication transaction on the administration queue comprising a secure channel concatenation value usable on an administration queue over a TLS secure channel to generate a second shared session key, wherein the second shared session key replaces the shared session key for future TLS negotiations.

9. The IHS of claim 1, wherein the TLS negotiation for the second TCP connection is performed by a second authentication transaction comprising a secure channel concatenation value that indicates no secure channel concatenation.

10. An Information Handling System (IHS), comprising:

a processor; and a memory coupled to the processor, wherein the memory comprises program instructions stored thereon that, upon execution by the processor, cause the IHS to:

derive a shared session key during a first Transmission Control Protocol (TCP) connection with a second IHS;

after disconnection of the first TCP connection, perform a Transport Layer Security (TLS) negotiation with the second IHS via a second TCP connection using the shared session key;

determine that the shared session key is not available on the second IHS;

close the TLS negotiation with the second IHS;

perform an authentication transaction via the second TCP connection, wherein the second TCP connection is unsecured, comprising a secure channel concatenation value usable on an administration queue over a TCP channel without TLS to generate a second shared session key;

disconnect the second TCP connection;

establish a third TCP connection with the second IHS; and perform a second TLS negotiation with the second IHS via the third TCP connection using the second shared session key derived during the second TCP connection.

11. The IHS of claim 10, wherein the program instructions, upon execution by the processor, further cause the IHS to:

establish a secure channel with the second IHS based, at least in part, on the TLS negotiation.

12. The IHS of claim 10, wherein to derive the shared session key with the second IHS, the program instructions, upon execution by the processor, further cause the IHS to:

perform a Non-Volatile Memory Express over Fabrics (NVMe-oF) authentication exchange with the second IHS.

13. The IHS of claim 10, wherein the second TCP connection uses a different TCP source port than the first TCP connection.

14. The IHS of claim 10, wherein unexpected non-TLS traffic of the first TCP connection is stranded by the disconnect of the first TCP connection.

15. The IHS of claim 10, wherein the first TCP connection is a Non-Volatile Memory Express (NVMe) TCP connection, and wherein the second TCP connection is an NVMe TCP connection using TLS.

16. The IHS of claim 10, wherein the shared session key with the second IHS is derived by a first authentication transaction, and wherein the first authentication transaction uses a Diffie-Hellman (DH) hash-based message authentication code (HMAC) Challenge-Handshake Authentication Protocol (CHAP).

* * * * *